(12) United States Patent
Chou et al.

(10) Patent No.: US 7,832,737 B2
(45) Date of Patent: *Nov. 16, 2010

(54) MULTI-LAYER SEAL FOR ELECTROCHEMICAL DEVICES

(75) Inventors: Yeong-Shyung Chou, Richland, WA (US); Kerry D. Meinhardt, Kennewick, WA (US); Jeffry W. Stevenson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/224,881

(22) Filed: Sep. 12, 2005

(65) Prior Publication Data

US 2006/0012135 A1    Jan. 19, 2006

Related U.S. Application Data

(62) Division of application No. 10/134,072, filed on Apr. 26, 2002, now Pat. No. 7,222,406.

(51) Int. Cl.
*F16J 15/12* (2006.01)
(52) U.S. Cl. .................. 277/652; 277/653; 277/654
(58) Field of Classification Search .......... 277/652–654
See application file for complete search history.

(56) References Cited

U.S. PATENT DOCUMENTS

| 2,429,955 | A | | 10/1947 | Goldsmith |
| 2,873,304 | A | * | 2/1959 | Davidson ............... 174/522 |
| 2,980,749 | A | * | 4/1961 | Broers ................... 429/38 |
| 3,480,421 | A | * | 11/1969 | Allen ..................... 65/33.5 |
| 4,156,533 | A | | 5/1979 | Close et al. |
| 4,286,010 | A | * | 8/1981 | Staley et al. ........... 428/215 |
| 4,374,892 | A | * | 2/1983 | Roberts ................. 442/33 |
| 4,761,349 | A | | 8/1988 | McPheeters et al. |
| 4,997,726 | A | | 3/1991 | Akiyama et al. |
| RE34,213 | E | | 4/1993 | Hsu |
| 5,238,754 | A | | 8/1993 | Yasuo et al. |
| 5,258,240 | A | | 11/1993 | Di Croce et al. |

(Continued)

FOREIGN PATENT DOCUMENTS

BE      1006102      11/1993

(Continued)

OTHER PUBLICATIONS

Lahl et al., "Aluminosilicate glass ceramics as sealants of SOFC stacks," *Solid Oxide Fuel Cells (SOFC VI)*; Proceedings of the Sixth International Symposium, edited by Singhal and Dokiya, The Electrochemical Society Proceedings, vol. 99-19, pp. 1057-1065 (1999).

(Continued)

*Primary Examiner*—Alison K Pickard
(74) *Attorney, Agent, or Firm*—Klarquist Sparkman, LLP

(57) ABSTRACT

Multi-layer seals are provided that find advantageous use for reducing leakage of gases between adjacent components of electrochemical devices. Multi-layer seals of the invention include a gasket body defining first and second opposing surfaces and a compliant interlayer positioned adjacent each of the first and second surfaces. Also provided are methods for making and using the multi-layer seals, and electrochemical devices including said seals.

26 Claims, 18 Drawing Sheets

U.S. PATENT DOCUMENTS

| | | | |
|---|---|---|---|
| 5,298,342 A | 3/1994 | Laurens et al. | |
| 5,453,331 A | 9/1995 | Bloom et al. | |
| 5,460,897 A | 10/1995 | Gibson et al. | |
| 5,532,071 A | 7/1996 | Pal et al. | |
| 5,725,218 A | 3/1998 | Maiya et al. | |
| 5,789,094 A | 8/1998 | Kusunoki et al. | |
| 6,017,647 A | 1/2000 | Wallin | |
| 6,060,189 A | 5/2000 | Mercuri et al. | |
| 6,106,967 A | 8/2000 | Virkar et al. | |
| 6,159,628 A | 12/2000 | Grasso et al. | |
| 6,165,632 A | 12/2000 | Blum et al. | |
| 6,232,008 B1 | 5/2001 | Wozniczka et al. | |
| 6,261,711 B1 | 7/2001 | Matlock et al. | |
| 6,265,095 B1 | 7/2001 | Hartvigsen et al. | |
| 6,271,158 B1 | 8/2001 | Xue et al. | |
| 6,291,092 B1 | 9/2001 | Kohli et al. | |
| 6,326,096 B1 | 12/2001 | Virkar et al. | |
| 6,565,099 B1 | 5/2003 | Öttinger et al. | |
| 6,656,625 B1 | 12/2003 | Thompson et al. | |
| 6,684,948 B1 | 2/2004 | Savage | |
| 6,821,667 B2 * | 11/2004 | England et al. | 429/468 |
| 6,828,263 B2 | 12/2004 | Larsen et al. | |
| 7,226,687 B2 * | 6/2007 | Meacham | 429/35 |
| 7,252,902 B2 * | 8/2007 | Bram et al. | 429/469 |
| 7,258,942 B2 * | 8/2007 | Chou et al. | 429/34 |
| 2002/0089126 A1 | 7/2002 | Murakami et al. | |

FOREIGN PATENT DOCUMENTS

| | | |
|---|---|---|
| BE | 1006102 A6 | 5/1994 |
| DE | 4325224 | 2/1995 |
| DE | 19542808 | 8/1996 |
| DE | 19608727 | 9/1997 |
| DE | 19640805 | 6/1998 |
| GB | 1496407 | 7/1975 |
| GB | 2 284 867 A | 6/1995 |
| GB | 2312479 A | 10/1997 |
| JP | 54023593 | 3/1979 |
| JP | 02189865 | 3/1992 |

OTHER PUBLICATIONS

Simner et al., "Compressive mica seals for SOFC applications," *J. Power Sources* 102(1-2):310-316, 2001.

Yammamoto et al., "Compatibility of mica glass-ceramics as gas-sealing materials for SOFC," *Denki Kagaku* 64(6):575-581, 1996.

"Chemical Abstracts & Indexes," American Chemical Society, Columbus, US (XP000664535) ISSN: 0009-2258.

Non-Final Office Action (Sep. 6, 2005) issued in U.S. Appl. No. 10/134,072.

Final Office Action (Mar. 20, 2006) issued in U.S. Appl. No. 10/134,072.

Office Action issued in U.S. Appl. No. 10/134,072, Sep. 13, 2006, 10 pages.

Office action issued in U.S. Appl. No. 11/787,053 dated Sep. 17, 2009.

* cited by examiner

MULTI-LAYER SEAL FOR ELECTROCHEMICAL DEVICES

PRIORITY CLAIM

This application is a divisional of U.S. application Ser. No. 10/134,072, filed Apr. 26, 2002 now U.S. Pat. No. 7,222,406, which is incorporated herein by reference.

GOVERNMENT RIGHTS

This invention was made with Government support under Contract Number DE-AC0676RLO1830 awarded by the U.S. Department of Energy. The Government has certain rights in the invention.

BACKGROUND OF THE INVENTION

The present invention relates to electrochemical devices that function by maintaining separate gaseous streams and causing reactions to occur at the surfaces of conductive layers of adjacent components.

Electrochemical devices having multiple components, such as, for example, solid oxide fuel cell (SOFC) stacks, syngas membrane reactors, oxygen generators and the like require a critical seal technology to separate gas streams (e.g., $H_2$ and $O_2$) and to prevent the streams from mixing with each other. Mixing of the gas streams has a variety of negative consequences, depending upon the type of device and the composition of the gaseous streams. One major problem that results from mixing of such gases is the possibility of thermal combustion of the gases and the resulting failure of the device.

One type of electrochemical device that has received, and continues to receive, significant attention is a fuel cell device. Fuel cell devices are known and used for the direct production of electricity from standard fuel materials including fossil fuels, hydrogen, and the like by converting chemical energy of a fuel directly to electrical energy. This conversion is accomplished by oxidizing the fuel without an intermediate thermal energy stage. Fuel cells typically include a porous anode, a porous cathode, and a solid or liquid electrolyte therebetween. Fuel (e.g., hydrogen) is fed to the anode where it is oxidized and electrons are released to the external circuit. Oxidant (e.g., oxygen) is fed to the cathode where it is reduced and electrons are accepted from the external circuit. The electron flow through the external circuit produces direct-current electricity. The electrolyte conducts ions between the two electrodes.

Fuel cells are classified into several types according to the electrolyte used to accommodate ion transfer during operation. Examples of electrolytes include aqueous potassium hydroxide, concentrated phosphoric acid, fused alkali carbonate, solid polymers, e.g., a solid polymer ion exchange membrane, and solid oxides, e.g., a stabilized zirconium oxide. Solid oxide fuel cell ("SOFC") devices have attracted considerable attention as the fuel cells of the third generation following phosphoric acid fuel cells and molten carbonate fuel cells of the first and second generations, respectively. SOFC devices have an advantage in enhancing efficiency of generation of electricity, including waste heat management, with their operation at high temperatures, typically above about 650° C.

Those involved in research and development of SOFC technology consider SOFC power generation as an emerging viable alternative to the use of internal combustion engines. Contrary to internal combustion, the oxygen is transported in a SOFC device via the vacancy mechanism through a dense ceramic electrolyte, and then reacted with the hydrogen electrochemically. Because the SOFC converts the chemical energy to electrical energy without the intermediate thermal energy step, its conversion efficiency is not subject to the Carnot Limit. Compared to conventional power generation, SOFC technology offers several advantages, including, for example, substantially higher efficiency, modular construction, minimal site restriction, and much lower air pollution.

In a typical SOFC, a solid electrolyte, made of dense yttria-stabllized zirconia (YSZ) ceramic, separates a porous ceramic anode from a porous ceramic cathode. The anode typically is made of nickel/YSZ cermet, and the cathode is typically made of doped lanthanum manganite. In such a fuel cell, an example of which is shown schematically in FIG. 1, the fuel flowing to the anode reacts with oxide ions to produce electrons and water. The water is removed in the fuel flow stream. The electrons flow from the anode through an external circuit and thence to the cathode. The oxygen reacts with the electrons on the cathode surface to form oxide ions that diffuse through the electrolyte to the anode. The electrolyte is a ceramic material that is a nonconductor of electrons, ensuring that the electrons must pass through the external circuit to do useful work. However, the electrolyte permits the oxygen ions to pass through from the cathode to the anode.

When fuel is supplied to the anode and oxidant is supplied to the cathode, a useable electric current is electrochemically generated by the flow of electrons through the external circuit from the anode to the cathode. As an example, the chemical reaction for a fuel cell using hydrogen as the fuel and oxygen as the oxidant is shown in equation (1).

$$H_2 + \tfrac{1}{2}O_2 \rightarrow H_2O \qquad \text{(Eq. 1)}$$

This process occurs through two redox or separate half-reactions which occur at the electrodes as follows:

Anode Reaction $$H_2 + O^{2-} \rightarrow H_2O + 2e^- \qquad \text{(Eq. 2)}$$

Cathode Reaction $$\tfrac{1}{2}O_2 + 2e^- \rightarrow O^{2-} \qquad \text{(Eq. 3)}$$

In the anode half-reaction, the hydrogen fuel is oxidized by oxygen ions from the electrolyte, thereby releasing electrons ($e^-$) to the external circuit as shown in equation (2) and as shown schematically in FIG. 1. The oxygen ions migrate through the fuel cell electrolyte from the cathode to the anode. In the cathode half-reaction, oxygen is fed to the cathode, where it supplies the oxygen ions ($O^{2-}$) to the electrolyte by accepting electrons from the external circuit. The movement of oxygen ions through the electrolyte maintains overall electrical charge balance, and the flow of electrons in the external circuit provides useful power. As alternatives to hydrogen, useful fuels for fuel cell power generation include, for example, carbon monoxide and methane.

Because each individual electrochemical cell, made of a single anode, a single electrolyte, and a single cathode, generates an open circuit voltage of about one volt, and each cell is subject to electrode activation polarization losses, electrical resistance losses, and ion mobility resistant losses which reduce its output to even lower voltages at a useful current, a fuel cell assembly comprising a plurality of fuel cell units electrically connected to each other is required to produce the desired voltage or current to generate commercially useful quantities of power.

Currently, there are two basic designs for SOFC applications: tubular and planar. With respect to planar SOFC designs, the individual electrochemical cells are typically connected together in series to form a stack. For example, planar solid oxide fuel cell stacks typically comprise a plurality of stacked cathode-electrolyte-anode-interconnect repeat units, and the fuel cell stack includes an electrical interconnect between the cathode and the anode of adjacent cells. The fuel cell assembly also includes ducts or manifolding to conduct the fuel and oxidant into and out of the stack. Channels for gas flow, either in a cross-flow or a co-flow or a counterflow configuration, are usually incorporated into the cathode, anode and/or interconnect. Planar designs are believed to potentially offer lower cost and higher power density per unit volume compared to tubular designs; however, planar designs face many challenges that must be overcome.

In addition to the challenges in materials development for electrolytes, anodes, and cathodes, planar SOFC designs require seals between each individual cell to prevent (or at least sufficiently minimize) leaking of gases from the stack as well as mixing of fuel and oxidant gases. Low fuel leak rates are required if SOFC stacks are to operate safely and economically. Furthermore, the seal needs to have long-term stability at the elevated temperatures and harsh (oxidizing, reducing and humid) environments typical of SOFCs during operation. Also, the seals should not cause corrosion or other degradation of the materials with which they are in contact (e.g., stabilized zirconia, interconnect, and electrodes). Perhaps most significantly, the seal needs to be suitably durable to acceptably perform its sealing function under repetitive thermal cycling.

A variety of features of a SOFC stack add to the difficulty of obtaining a good seal. For one, both the cell (including anode, electrolyte and cathode layers) and the interconnect, whether of ceramic or metallic material, are rigid. As a result, to achieve an effective seal, the mating surfaces between the cell and the interconnect must be flat and parallel. Nevertheless, because all of the components are rigid, even with good flatness, it is necessary to seal the surfaces in some manner to prevent leakage of the gases.

Another feature of electrochemical devices, such as SOFCs, that lends to the difficulty of obtaining a good seal relates to the fact that diverse compositions are used as the components of a SOFC device, and the diverse compositions have differing thermal expansion characteristics. In this regard, in various types of fuel cell assemblies adapted for use at high operating temperatures, a monolithic design is used in which the entire structure is made of ceramics. In other designs, individual components are rigidly and hermetically sealed using, for example, glass seals, glass-ceramic seals, cermet seals or metallic braze. While such monolithic or rigidly formed fuel cells are well equipped to prevent gas leakage, ceramics have the inherent material characteristic of low ductility and low toughness. Consequently, they are susceptible to damage by mechanical vibrations and shocks. Furthermore, and perhaps more problematic, such assemblies are extremely susceptible to thermal shocks and to thermally induced mechanical stresses due to the different thermal expansion characteristics of the components.

A wide variety of applications for which SOFC devices can be used to advantage involve intermittent power demands, and thus involve intermittent usage and nonusage, and thus repeated heating and cooling cycles. Given the variety of materials used to make a single cell, and the difficulty of selecting suitable materials that have precisely matched coefficients of thermal expansion, it is readily seen that the use of rigid seals presents significant problems. Furthermore, where the fuel cell is designed to be used at lower temperatures with a low-temperature ceramic electrolyte, some components of the fuel cell may be made of metals, which are generally less expensive to fabricate than ceramic components and have the advantage of improved ductility and fracture toughness, making them more resistant to mechanical and thermal shock damage than ceramics. However, in a fuel cell using metals for at least some components and ceramics for at least some components, rigid sealing is perhaps an even greater problem because most alloys potentially suitable for the SOFC interconnect application have much higher coefficients of thermal expansion than do ceramics, resulting in large thermal stresses and strains produced during operation of such a fuel cell. When a metal/ceramic fuel cell is heated and cooled, the dimensions of the metal components change more than the dimensions of the ceramic components, leading to thermal strains within the structure. These thermal strains produce thermal stresses that can lead to failure of the ceramic components or the rigid seals between the ceramic and metal components.

Another type of seal that has been considered for use in connection with SOFC devices is a compressive seal. In a device designed to utilize a compressive seal, a layer of inert material is placed between components of the SOFC and a compressive force is applied to the components and the material therebetween in an attempt to block leakage between the components. In comparison to rigid ceramic, glass or metallic seals, compressive seals potentially offer several advantages. Since they are not rigidly bonded to the cells, the need for matching coefficients of thermal expansion (CTE) of all stack components is reduced or eliminated. The cells and interconnects are allowed to expand and contract more freely during thermal cycling and operation, thereby reducing structural degradation during thermal cycling and routine operation. Elimination of the need for matching CTE greatly expands the list of candidate interconnect materials, whether ceramic or metallic. The compressive seals also have two unique advantages over rigid seals. One is that cells in stacks may be reusable since they are not bonded with one another. Secondly, it allows non-destructive post-service analysis Research in the area of the compressive seals is still in its early stages and very little data is available. One group discussed the use of compressed mica in a single-cell SOFC set-up; however the effectiveness was not discussed. (Kim and Virkar, *Solid Oxide Fuel Cells* (SOFC VI) Proceedings of the Sixth International Symposium, edited by S. C. Sighal and M. Dokiya, The Electrochemical Society, Proceedings Volume 99-19, 830 (1999)). A recent publication discusses work relating to micas in paper form and cleaved single crystal micas as compressive seals for SOFC applications. (Simner et al. "Compressive mica seals for SOFC applications," *J. Power Sources,* 102 [1-2], 310-316, (2001)). The results showed that cleaved natural mica sheets were far superior compared to mica papers. For the mica sheets, leak rates of about 0.33-0.65 sccm/cm at 800° C. and 100 psi were measured on small test coupons simulating a single interconnect/seal/cell/seal/interconnect unit. A coupon leak rate of 0.33-0.65 sccm/cm, however, is believed to translate to unacceptably high leak rates for actual SOFC stacks, in which multiple, full size components would be stacked together with the gaskets between each component.

In view of the above background, it is apparent that one important challenge in the development of SOFC assemblies and other electrochemical devices is the development of sealing technology offering suitably low leak rates. There is a continuing need for further developments in the field of seals for such electrochemical devices. The present invention addresses this need, and further provides related advantages.

SUMMARY OF THE INVENTION

Accordingly, it is one object of this invention to provide devices and methods for sealing between components of an electrochemical device, such as, for example, a solid oxide fuel cell stack, a syngas membrane reactor, an oxygen generator and the like.

It is another object of this invention to provide solid oxide fuel cell stacks and other electrochemical devices that can be subjected to wide variations in temperature without rapid failure from cracking.

It is yet another object of this invention to provide solid oxide fuel cell stacks and other electrochemical devices for which thermal expansion match between components thereof is not required.

These and other objects of this invention are achieved by the present invention, which provides electrochemical devices, such as, for example, solid oxide fuel cell devices, syngas membrane reactors, oxygen generators and the like, that include novel multi-layer seals between components to prevent intermixing of diverse gaseous streams.

The present invention also provides solid oxide fuel cell stacks and other electrochemical devices that can be subjected to wide variations in temperature without rapid failure from cracking.

The present invention also provides solid oxide fuel cell stacks and other electrochemical devices for which thermal expansion match between components thereof is not required.

The present invention also provides novel multi-layer compressive seals that provide excellent leak barriers at high temperatures, and methods for making and using same.

Further forms, embodiments, objects, features, and aspects of the present invention shall become apparent from the description contained herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DESCRIPTION OF THE PREFERRED EMBODIMENTS

For the purpose of promoting an understanding of the principles of the invention, reference will now be made to preferred embodiments and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
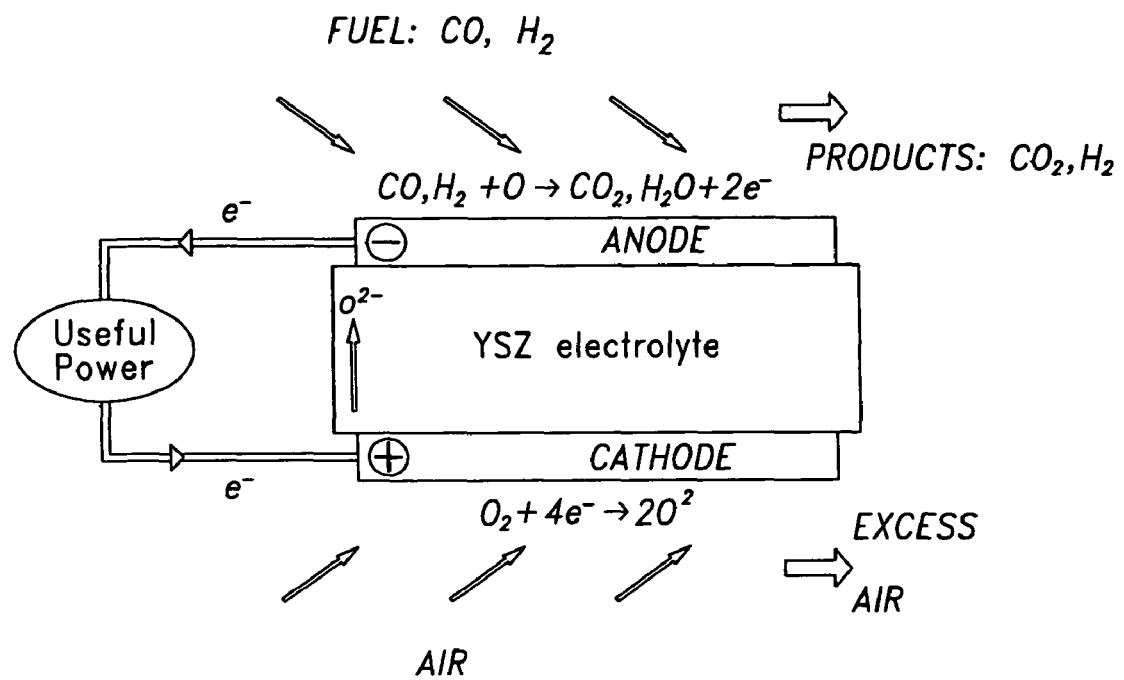
FIG. 1 depicts a general schematic diagram showing the function of a solid oxide fuel cell.
Figure 2:
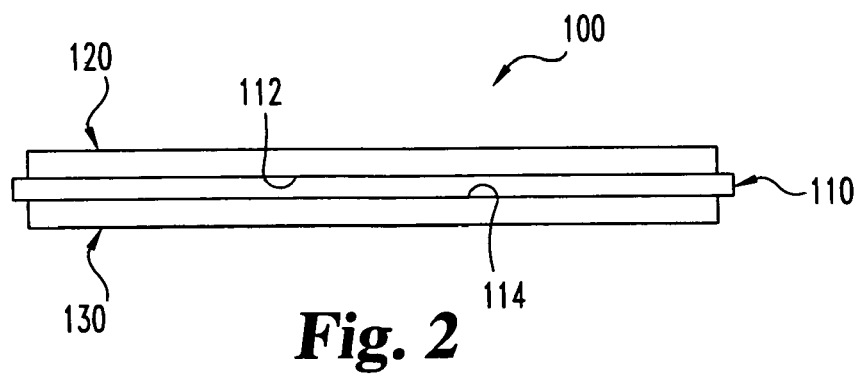
FIG. 2 is a schematic diagram of an embodiment of a multi-layer seal in accordance with the invention.
Figure 3:
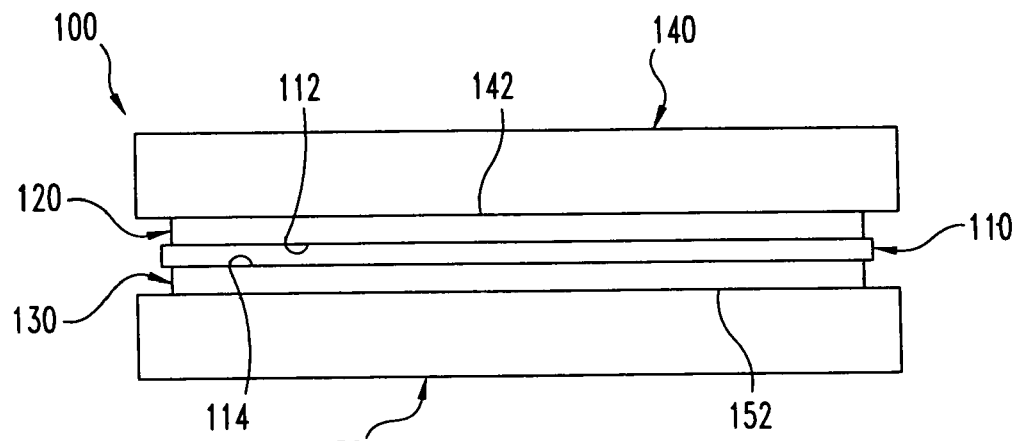
FIG. 3 is a schematic diagram of a multi-layer seal as shown in FIG. 2, oriented between components of an electrochemical device.
Figure 4:
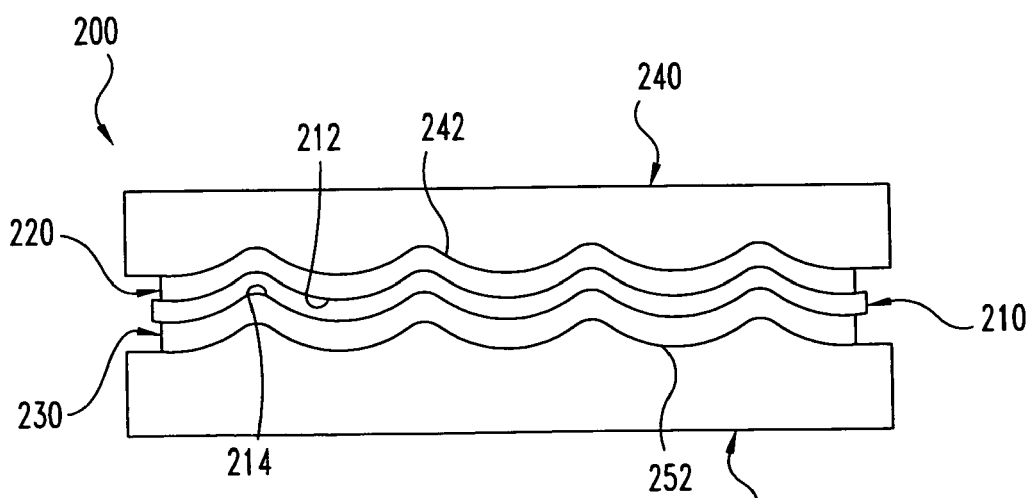
FIG. 4 is a schematic diagram of another embodiment of a multi-layer seal in accordance with the invention, oriented between components of an electrochemical device.

The present invention provides a novel manner of sealing adjacent components of an electrochemical device to prevent the leakage of gases between the components. In accordance with one aspect of the invention, a multi-layer seal is positioned at the junction between two adjacent components of an electrochemical device and a compressive force is applied to the components and the seal to achieve sealing. Referring to the embodiment set forth in FIG. 2, multi-layer seal 100 is composed of a gasket body 110 disposed between two compliant interlayers 120, 130. As used herein, the term "interlayer" refers to a layer of the multi-layer seal that, when positioned for use, lies between the gasket body 110 and an adjacent component, as depicted in FIG. 3. Thus, when an inventive multi-layer seal is placed in a junction between adjacent components, as depicted in FIG. 3, interlayer 120 is positioned between gasket body 110 and component 140, and interlayer 130 is positioned between gasket body 110 and component 150. Gasket body 110 is formed to define first and second opposing surfaces 112, 114 configured to correspond to surfaces 142, 152 of components 140, 150, respectively. The term "correspond" is intended to indicate that surfaces 112, 114 of gasket body 110 are shaped to generally meet surfaces 142, 152 of components 140, 150, respectively, irrespective of whether surfaces 142, 152 are planar. In an embodiment, for example, in which component surfaces 242, and 252 are not planar, as depicted in FIG. 4, surfaces 212, 214 of gasket body 210 are formed to correspond thereto along at least a portion of the junction. It is of course understood that the embodiment set forth in FIG. 4 is intended to provide an example of a junction in which component surfaces 242, 252 are not planar, but is not intended to limit the invention to the surface type shown. It is well within the purview of a person of ordinary skill in the art to envision, make and use alternative junction surface configurations in accordance with the invention. It is, of course, recognized that interlayers 120, 130, 220, 230 lie between the corresponding surfaces 112, 114, 212, 214 of gasket body 110, 210, and surfaces 142, 152, 242, 252 of components 140, 150, 240, 250, respectively. When a compressive force is applied to components 140, 150, 240, 250 and multi-layer seal 100, 200, the multi-layer seal provides an effective barrier against leakage of gases through the junction.

It is readily understood that in electrochemical devices, it is often necessary to maintain discrete electrical circuits, of which certain components of the electrochemical device often are an integral part. As such, it is often important to use a non-conducting or insulating seal between the components to prevent electrical shorting within the device. In certain embodiments of the invention, gasket body 110, 210 comprises a non-conducting material. In other embodiments, at least one of interlayers 120, 130, 220, 230 comprises a non-conducting material. In yet other embodiments, gasket body 110, 210 and interlayers 120, 130, 220, 230 are formed of non-conducting materials.

In one embodiment, the gasket body comprises mica. The term "mica" encompasses a group of complex aluminosilicate minerals having a layer structure with varying chemical compositions and physical properties. More particularly, mica is a complex hydrous silicate of aluminum, containing potassium, magnesium, iron, sodium, fluorine and/or lithium, and also traces of several other elements. It is stable and completely inert to the action of water, acids (except hydrofluoric and concentrated sulfuric) alkalies, convention solvents, oils and is virtually unaffected by atmospheric action. Stoichiometrically, common micas can be described as follows:

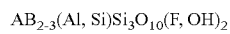

where A=K, Ca, Na, or Ba and sometimes other elements, and where B=Al, Li, Fe, or Mg. Although there are a wide variety of micas, the following six forms make up most of the common types: Biotite ($K_2(Mg, Fe)_2(OH)_2(AlSi_3)_{10})$), Fuchsite (iron-rich Biotite), Lepidolite ($LiKAl_2(OH, F)_2(Si_2O_5)_2$), Muscovite ($KAl_2(OH)_2(AlSi_3O_{10})$), Phlogopite ($KMg_3Al(OH)Si_4O_{10}$)) and Zinnwaldite (similar to Lepidolite, but iron-rich). Mica can be obtained commercially in either a paper form or in a single crystal form, each form of which is encompassed by various embodiments of the invention. Mica in paper form is typically composed of mica flakes and a binder, such as, for example, an organic binder such as a silicone binder or an epoxy, and can be formed in various thicknesses, often from about 50 microns up to a few millimeters. Mica in single crystal form is obtained by direct cleavage from natural mica deposits, and typically is not mixed with polymers or binders.

Micas are cleavable in the direction of the basal plane, which permits them to split easily into optically flat films, sometimes as thin as one micron in thickness. When split into thin films, they remain tough and elastic even at high temperature. Many forms of mica are transparent, colorless in thin sheets, resilient and generally incompressible. With respect to electrical properties, mica has the unique combination of great dielectric strength, uniform dielectric constant and capacitance stability, low power loss (high Q factor), high electric resistivity and low temperature coefficient and capacitance. It is noted for its resistance to arc and corona discharge with no permanent injury and has little or no effect when exposed to electronic radiation dosages up to $10^{18}$ ivt. With respect to thermal properties, mica is fire proof, infusible, incombustible, and non-flammable and can resist temperatures in excess of 600° C., and significantly higher, depending upon the type of mica. It has low heat conductivity, excellent thermal stability, and may be exposed to high temperatures without noticeable effect. Mica is also relatively soft and can be hand cut, machined or die-punched. It is flexible, elastic and tough, having high tensile strength, and can withstand great mechanical pressure perpendicular to plane but the lamination has cleavage and can be easily split into very thin leaves.

In one embodiment of the present invention, Muscovite is selected for use as the gasket body. In another embodiment, the gasket body comprises Muscovite in single crystal form. In yet another embodiment, the gasket body comprises Muscovite in paper form. In still another embodiment, Phlogopite is selected for use as the gasket body. In another embodiment, the gasket body comprises Phlogopite in single crystal form. In yet another embodiment, the gasket body comprises Phlogopite in paper form. In another embodiment, the gasket body comprises a mica selected from the group consisting of Biotite, Fuchsite, Lepidolite, Muscovite, Phlogopite and Zinnwaldite. In another embodiment, the gasket body comprises synthetic mica, a variety of forms of which are available commercially. It is also contemplated that other materials can be selected for use in accordance with the invention as the gasket body as would occur to a person of ordinary skill in the art. It is well within the purview of a person of ordinary skill in the art to select a mica or other material for use in forming the gasket body, depending upon the type of electrochemical device being constructed, and the operations conditions of the device. In one embodiment of the invention, the gasket body has a thickness of from about 25 microns to about 2 millimeters.

As described above, the multi-layer seal also includes a compliant interlayer on each opposing surface of the gasket body. As used herein, the term "compliant" is intended to refer to a property of the material whereby, under operating conditions of the electrochemical device, the material has a degree of plastic deformation under a given compressive force to block gas leakage pathways through the junction. Such gas leakage pathways can result, for example, from defects in the adjacent surfaces of the components, or other irregularities in the surfaces, including grooves on a metal component or grooves or voids on a ceramic component. Materials that can be used to form the compliant interlayers in various embodiments include, for example and without limitation, a glass, a glass-ceramic, a mica glass-ceramic, a phase-separated glass, a glass composite, a cermet, a metal, a metal alloy and a metal composite. To make a multi-layer seal in accordance with the invention, compliant interlayers can be applied to the gasket body in a variety of manners, including, for example and without limitation, dip-coating, painting, screen printing, deposition, spattering, tape casting and sedimentation. In addition, the compliant interlayer material can be provided in a variety of forms, including, for example, as fibers, granules, powders, slurries, liquid suspensions, pastes, ceramic tapes, metallic foils and others.

As stated above, compliant interlayers deform under a compressive force and under operating conditions of an electrochemical device to conform to the surfaces, including surface irregularities, of adjacent components, and to thereby provide a barrier to leakage of gases under operating temperatures and conditions of the electrochemical device. An important feature of the invention is the ability of at least one of the material interfaces at the junction, such as, for example, a component/interlayer interface or an interlayer/gasket body interface, to remain unbonded during operation of the electrochemical device, including heating and/or cooling cycles. As used herein, the term "unbonded" with respect to such materials at an interface is intended to mean that the components in contact at the interface are free to move (i.e., expand, contract or slide) independently of one another. Thus, during heating and/or cooling of the electrochemical device, the first component, first interlayer, gasket body, second interlayer and second component do not form a rigid mass, as occurs, for example, in devices having glass seals, which melt under operating temperatures and then rigidly bond adjacent parts to one another upon cooling.

In one embodiment of the invention, an interlayer of the multi-layer seal comprises a compliant material, such as, for example, a metallic material, that has a melting temperature greater than the operating temperature of an electrochemical device in which the multi-layer seal is to be used. In this embodiment, the interlayer does not melt, and does not become bonded to a component or the gasket body under operating conditions. In another embodiment, the gasket body comprises mica, which has been found by the present inventors to be satisfactorily resistant to bonding with materials it contacts during operation at high temperatures whether or not the interlayer comprises a materiel that melts under the operating temperatures. In another embodiment, the mica is a single crystal mica. While it is not intended that the present invention be limited by any theory whereby it achieves its advantageous result, it is believed that an interlayer that melts under operating temperatures may bond to the surface of a single crystal mica upon cooling, but that the physical properties of the mica allows a few sublayers of the mica crystal to cleave from the gasket body, thus maintaining a non-bonded interface.

In one embodiment, the compliant interlayer comprises glass. Although a wide variety of glass compositions can be used, as would occur to a person of ordinary skill in the art, it is important that the glass composition selected for use have a softening point lower than or equal to the operating temperature of the device in which the seal is to be used. Softening point, or softening temperature, of glass is defined under ASTM C338 as the temperature at which a uniform fiber of glass (0.55-0.75 mm diameter and 23.5 cm length) elongates under its own weight at 1 mm/min when the upper 10 cm is heated at 5° C./min. For glass having a density of 2.50 g/cc, this corresponds to a viscosity of about $10^{6.6}$ Pa.s. It is also desirable when selecting a glass composition for the interlayer to select a glass composition that is not corrosive to surfaces of the components that come into contact with the interlayer under operating conditions, such as, for example, metallic components, ceramic components, and the gasket body. In one embodiment, the glass composition selected for use is an aluminosilicate glass. In another embodiment, the glass composition selected for use is a borosilicate glass. In another embodiment, the glass selected for use includes an alkaline earth element, such as, for example, strontium, magnesium and/or calcium, or an alkali additive, such as, for example, sodium, potassium and/or lithium. In other embodiments the interlayer comprises a glass-ceramic material (i.e., a glass-ceramic material as described in Lahl et al., "Aluminosilicate glass ceramics as sealant in SOFC stacks," in *Solid Oxide Fuel Cells* (SOFC VI) Proceedings of the Sixth International Symposium., edited by S. C. Singhal and M. Dokiya, The Electrochemical Society, Proceedings Volume 99-19, 1057-1065 (1999)) or a mica glass-ceramic material (i.e., a mica glass-ceramic material as describe in Yamamoto et al, "Compatibility of mica glass-ceramics as gas-sealing materials for SOFC," *Denki Kagaku* 64 [6] 575-581 (1996)).

In another embodiment of the invention, the multi-layer seal comprises at least one metallic interlayer. In one embodiment, the metallic interlayer comprises a noble metal, such as, for example, gold, silver, palladium, or platinum. In another embodiment, the metallic interlayer comprises a high-temperature alloy. It is also contemplated that other metals can be used that are resistant to oxidation under operating conditions of the electrochemical device. Metallic interlayers can be conveniently provided in the form of a metallic foil, such as a foil having a thickness of from about 0.005 mm to about 1 mm. In another embodiment, the metallic foil has a thickness of from about 0.01 mm to about 0.5 mm. In one embodiment of the invention, the interlayer comprises silver. In another embodiment, the interlayer comprises a silver foil having a thickness of from about 1 mil (25 microns) to about 10 mil (250 microns). In still another embodiment, the interlayer comprises a silver foil having a thickness of about 5 mils. Metallic layers comprising other metals in various embodiments can also be provided in the form of foils, including foils having thicknesses as set for above.

To seal a junction between adjacent components of an electrochemical device, a multi-layer seal as provided herein is positioned between the adjacent components such that each compliant interlayer is positioned between the gasket body and one of the components. Sealing is then accomplished by applying a compressive force to the components and the seal to maintain the seal in position and to cause the compliant interlayers to mold to surface defects in the surfaces of the components and the gasket body under operating conditions of the device. In one embodiment of the invention, the compressive force is a force of from about 5 to about 500 pounds per square inch (psi). In another embodiment, the compressive force is a force of from about 10 to about 400 psi. In another embodiment, the compressive force is a force of from about 15 to about 300 psi.

In operation of an electrochemical device including an inventive seal, the temperature of the seal increases as the temperature of the electrochemical device increases toward its normal operating temperature. In an embodiment comprising a glass interlayer, as the temperature increases beyond the softening temperature of the glass, the glass, under the compressive force, deforms to mold to surface irregularities. When a metallic interlayer is used, the same phenomenon occurs if the operating temperature of the electrochemical device exceeds the melting point of the metallic material selected for use. Even if the operating temperature does not exceed the melting point of the metallic material, the metallic interlayer selected for use in accordance with the invention deforms under the compressive force to effectively form a barrier to leakage of gases through the junction during operation of the device.

It is readily understood that a variety of electrochemical devices, such as, for example and without limitation, solid oxide fuel cells, syngas membrane reactors, and oxygen generators, have a plurality of adjacent functional units to increase the efficiency of the device and to increase output of the device to a more useful level, whether the output of the device is electricity, synthetic gas, oxygen or other. Arrangement of a plurality of units is often accomplished by providing stacked planar units. It is readily understood that such planar units act as boundaries between diverse gaseous streams, and, when in a stacked arrangement, form a plurality of junctions therebetween.

Figure 5:
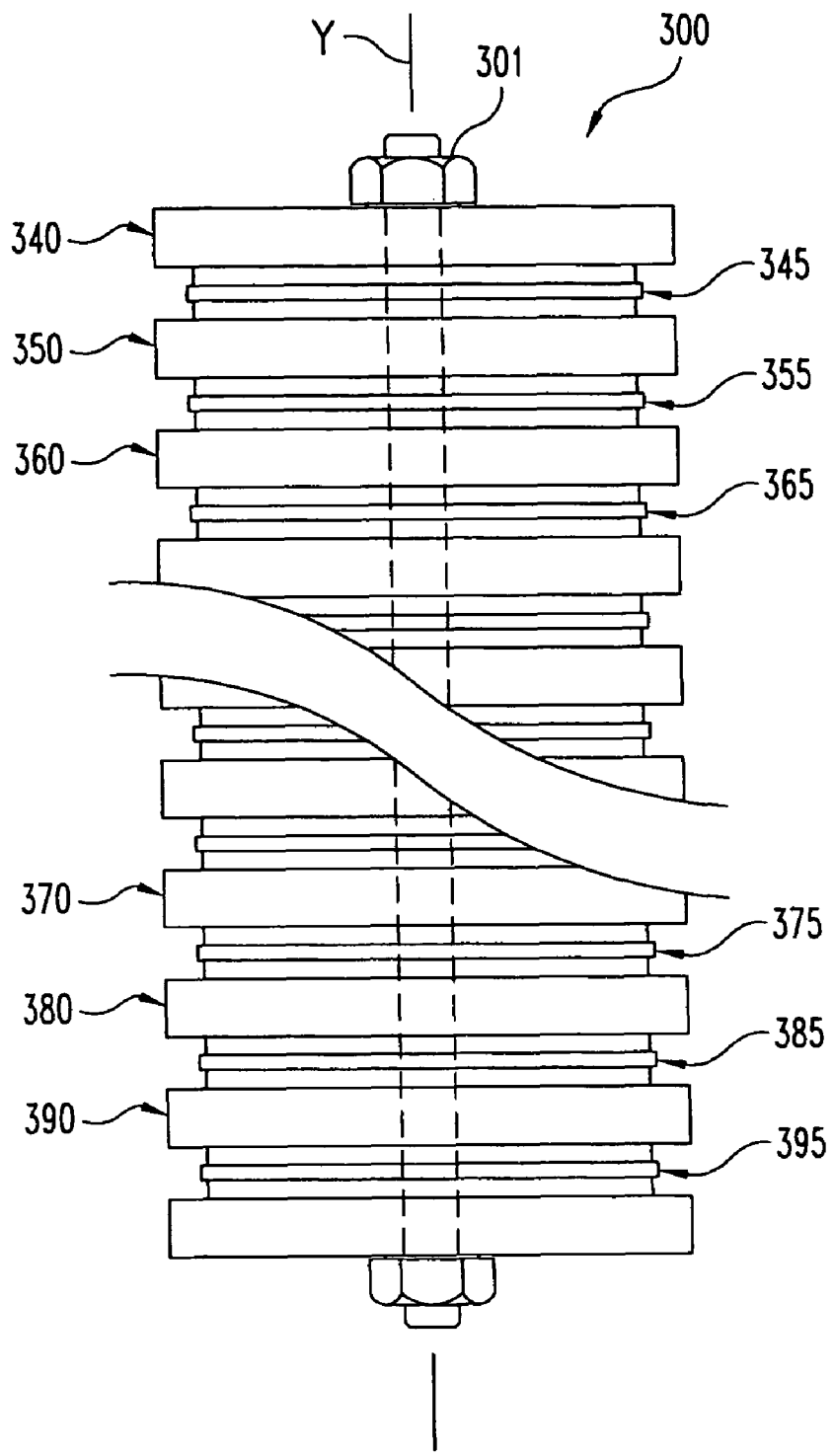
FIG. 5 is a schematic diagram of an embodiment of an electrochemical device of the invention.
Figure 6:
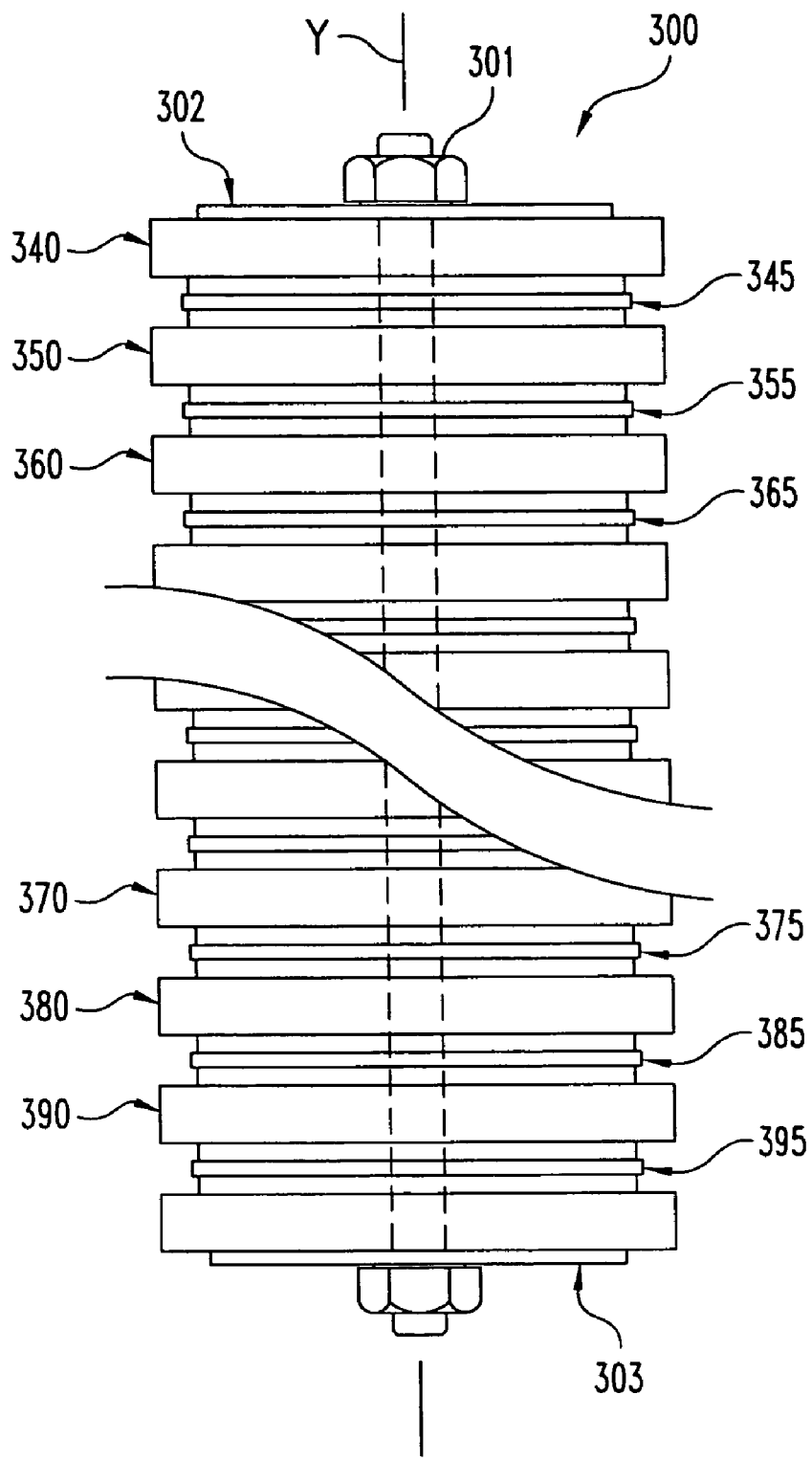
FIG. 6 is a schematic diagram of another embodiment of an electrochemical device of the invention.

In one aspect of the invention, therefore, an electrochemical device having a plurality of adjacent components is provided that includes an inventive multi-layer seal positioned at one or more junction, preferably at multiple junctions. In a preferred embodiment, the device includes an inventive multi-layer seal at each such junction. Referring now to FIG. 5, electrochemical device 300 includes multiple components, for example, components 340, 350, 360, 370, 380, 390 with multi-layer seals positioned therebetween, for example, seals 345, 355, 365, 375, 385, 395. Device 300 also includes a compression member 301 configured to exert a compressive force to the components and the seal. In one embodiment, as depicted in FIG. 6, compression member 301 includes end plates 302, 303 and device 300 is compressed and maintained in its assembled state between the end plates 302, 303. In one embodiment, compression member 301 includes one or more metal tie rods or tension members. The tie rods can extend through holes formed in end plates 302, 303, and have associated nuts or other fastening means to secure them in the stack assembly. The tie rods can be external, that is, not extending through the fuel cell units, or one or more internal tie rods can be used which extend between the stack end plates through openings in the fuel cell units as, for example, described in U.S. Pat. No. 5,484,666. In other embodiments, compression member 301 includes springs, hydraulic or pneumatic pistons, pressure pads or other resilient compressive means to cooperate with tie rods and end plates, or as alternatives to tie rods, to urge the two end plates towards each other to compress the fuel cell stack components. It is not intended that the present invention be limited by the type of compression member selected for application of the compressive force, and a variety of suitable mechanisms are well within the purview of a person of ordinary skill in the art. Further examples are provided in U.S. Pat. Nos. 4,478,917 and 5,176,966, which are hereby incorporated by reference herein in their entireties.

In one embodiment of the invention, the electrochemical device is a solid oxide fuel cell ("SOFC") assembly for electrochemically reacting a fuel gas with a flowing oxidant gas at an elevated temperature to produce a DC output voltage. The SOFC includes a plurality of generally planar integral fuel cell units. Referring, for example to FIG. 5, in a SOFC stack assembly, each of components 340, 350, 360, 370, 380, 390 is an integral fuel cell unit comprising a layer of ceramic ion conducting electrolyte disposed between a conductive anode layer and a conductive cathode layer. The units are arranged one on another along a longitudinal axis (Y) perpendicular to the planar units to form a fuel cell stack. Multi-layer seals 345, 355, 365, 375, 385, 395 are disposed between the anode layer and the cathode layer of adjacent fuel cell units, optionally with an interconnect (not shown) also positioned in contact with the anode and/or cathode layer. The SOFC also includes a compression member 301 configured to exert a compressive force along the longitudinal axis.

As will be appreciated by a person of ordinary skill in the art in view of the present description, in one form of the present invention, a multi-layer seal for sealing a junction between adjacent components of an electrochemical device is provided. The multi-layer seal includes a gasket body defining first and second opposing surfaces; a first compliant interlayer positioned adjacent the first surface; and a second compliant interlayer positioned adjacent the second surface. In one embodiment, the opposing surfaces of said gasket body are configured to correspond to junction surfaces of the adjacent components of the electrochemical device. In another embodiment, each of said first and second compliant interlayers is positioned to be disposed between the gasket body and the junction surface of one of the adjacent components. In yet another embodiment, the gasket body comprises a single crystal mica or a mica paper. The mica can be, for example, Muscovite, Phlogopite, Biotite, Fuchsite, Lepidolite or Zinnwaldite. In still another embodiment, the at least one of the compliant interlayers comprises a member selected from the group consisting of a glass, a glass-ceramic, a mica glass-ceramic, a phase-separated glass, a glass composite, a cermet, a metal, a metal alloy and a metal composite.

In one preferred embodiment, at least one of the compliant interlayers comprises glass. In another embodiment, the glass has a softening point lower than or equal to the operating temperature of the electrochemical device. In another preferred embodiment, at least one of the compliant interlayers comprises a metal. In another embodiment, the metal is selected from the group consisting of gold, silver, palladium and platinum. In still another embodiment, at least one of the compliant interlayers is a metallic foil having a thickness of from about 0.005 millimeters to about 1 millimeter. In yet another embodiment, at least one of the compliant interlayers is a metallic foil having a thickness of from about 0.01 millimeters to about 0.5 millimeters.

In another form of the invention, an electrochemical device is provided that includes a plurality of components, the components forming at least one boundary between diverse gaseous streams and defining at least one junction between the components. A multi-layer seal is positioned at the junction, the seal composed of a gasket body disposed between two compliant interlayers. With the seal thus positioned, each compliant interlayer is positioned between the gasket body and one of said components. The electrochemical device also includes a compression member for exerting a compressive force to the components and the seal.

In certain embodiments, the seal is a non-conducting seal. In one embodiment, the gasket body comprises mica. In another embodiment, the gasket body of the multi-layer seal has a thickness of from about 25 microns to about 2 millimeters. In yet another embodiment, at least one of the compliant interlayers comprises glass. In certain embodiments, the glass has a softening point lower than or equal to the operating temperatures of the device. The glass is preferably a glass that is not corrosive to surfaces of the components in contact with the glass under operating conditions. In one embodiment, the glass composition selected for use is an aluminosilicate glass. In another embodiment, the glass composition selected for use is a borosilicate glass. In another embodiment, the glass selected for use includes an alkaline earth element, such as, for example, strontium, magnesium and/or calcium, or an alkali additive, such as, for example, sodium, potassium and/or lithium. In yet another embodiment, each of the glass interlayers has a thickness of from about 0.005 millimeters to about 5 millimeters prior to heating. In still another embodiment, the glass interlayer has a thickness of from about 0.05 millimeters to about 0.5 millimeters prior to heating.

In another embodiment of the electrochemical device, at least one of the compliant layers comprises a metal. The metal selected for use is preferably resistant to oxidation under operating conditions of the device. In one embodiment, the metal is selected from the group consisting of gold, silver, palladium and platinum. In another embodiment, the compliant interlayer is a metallic foil having a thickness of from about 0.005 millimeters to about 1 millimeter prior to heating.

Another form of the invention is a method for making a multi-layer seal, comprising (1) providing a gasket body defining first and second generally flat opposing surfaces; and (2) applying a compliant material to said first and second surfaces to form first and second compliant interlayers. In certain embodiments, the gasket body comprises mica and/or at least one of the compliant interlayers comprises a member selected from the group consisting of a glass, a glass-ceramic, a mica glass ceramic, a phase-separated glass, a glass composite, a cermet, a metal, a metal alloy and a metal composite. The compliant material can be applied to the first and second surfaces of the gasket body, for example, by dip-coating, painting, screen printing, deposition, spattering, tape casting or sedimentation.

In another form of the invention, there is provided a method for sealing a junction between adjacent ceramic or metallic components of an electrochemical device, comprising (1) positioning between the adjacent components a multi-layer seal composed of a gasket body disposed between a first compliant interlayer and a second compliant interlayer, wherein each of the first and second compliant interlayers is positioned between the gasket body and one of the components; and (2) applying a compressive force to the components and the seal. In one embodiment, the compressive force is a force of from about 5 to about 500 psi.

In another form of the invention, there is provided a solid oxide fuel cell assembly for electrochemically reacting a fuel gas with a flowing oxidant gas at an elevated temperature to produce a DC output voltage, said solid oxide fuel cell. The SOFC assembly includes a plurality of generally planar integral fuel cell units, each unit comprising a layer of ceramic ion conducting electrolyte disposed between a conductive anode layer and a conductive cathode layer, and the units are arranged one on another along a longitudinal axis perpendicular to the planar units to form a fuel cell stack. The assembly also includes a multi-layer non-conducting seal disposed between the anode layer and the cathode layer of adjacent fuel cell units. The seal is composed of a gasket body disposed between two compliant interlayers. The assembly also includes a compression member for exerting a compressive force along the longitudinal axis. In one embodiment, the compressive force is a force of from about 5 to about 500 psi.

Reference will now be made to specific examples illustrating various preferred embodiments of the invention as described above. It is to be understood that the examples are provided to illustrate preferred embodiments and that no limitation to the scope of the invention is intended thereby.

EXAMPLE ONE

Leak Test

Comparitive Data

1. Plain Mica Seal (Compressive Mica Seals)

Figure 7:
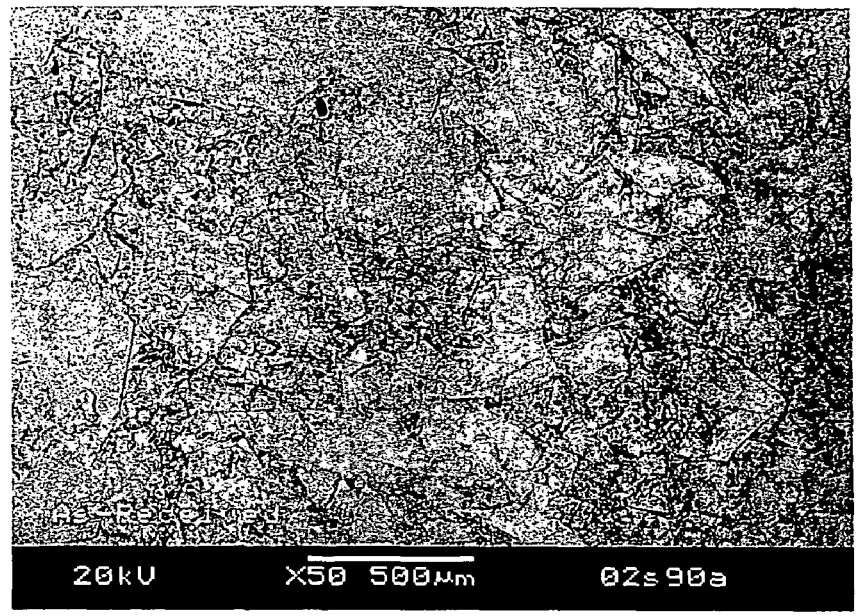
FIG. 7 is an optical micrograph showing the surface texture of the as-received Phlogopite paper used in the work set forth in the Examples, showing large discrete Phlogopite flakes overlapping one another.
Figure 8:
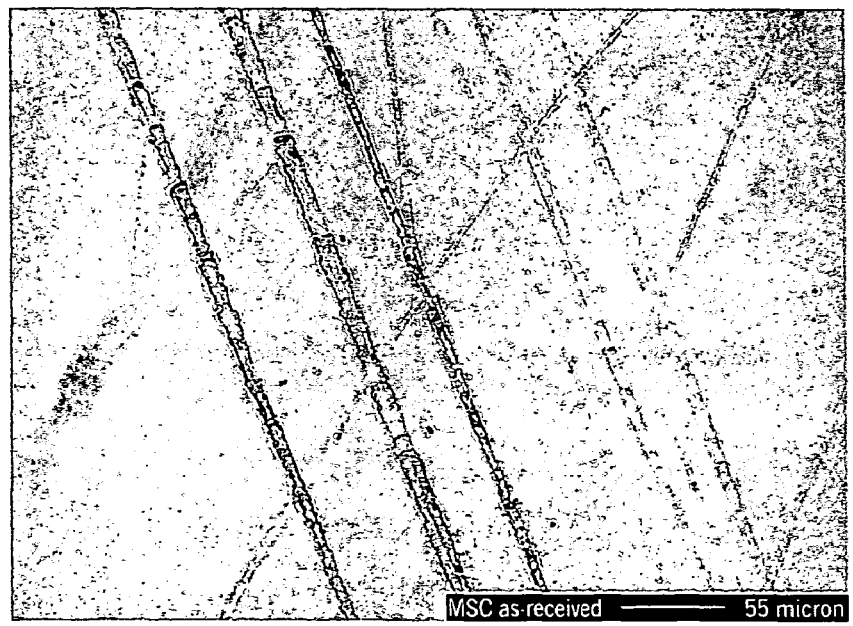
FIG. 8 is an optical micrograph showing the surface texture of the as-received Muscovite single crystal. The material is transparent and the surface is very smooth and has fewer defects, although some scratches are visible.
Figure 9:
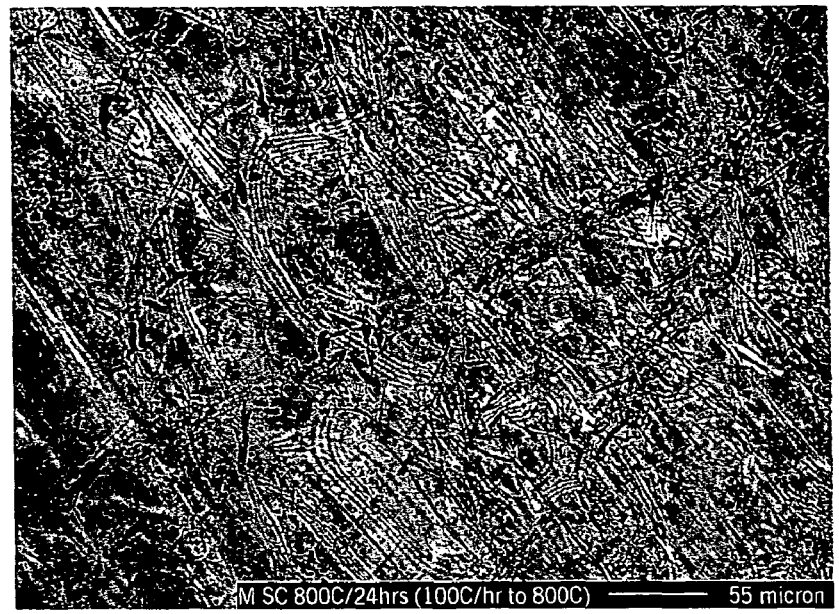
FIG. 9 is an optical micrograph showing the surface texture of the Muscovite single crystal after 800° C. heat-treatment, as described in the Examples, showing that, after heating, the material becomes opaque and also develops micro-cracks.
Figure 10:
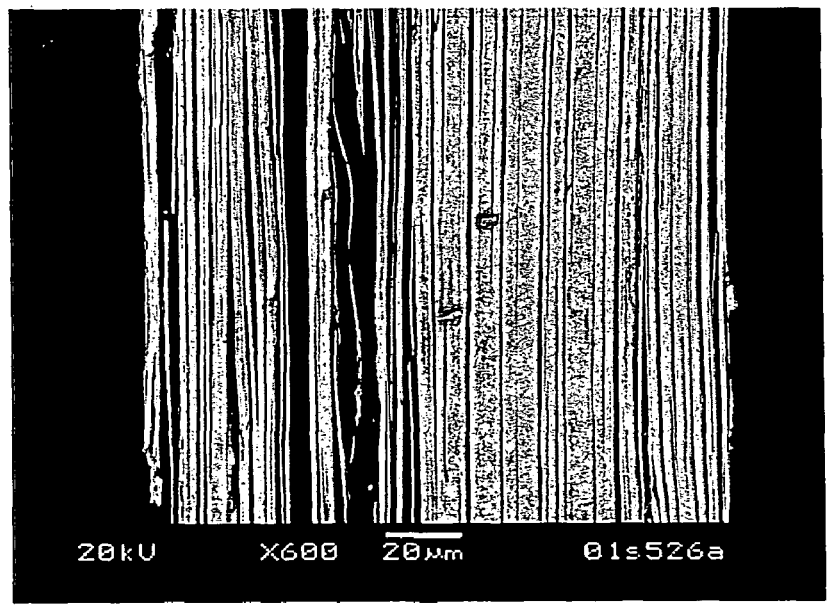
FIG. 10 is a scanning electron micrograph showing the cleavage of Muscovite single crystal after heat-treatment at 800° C.
Figure 11:
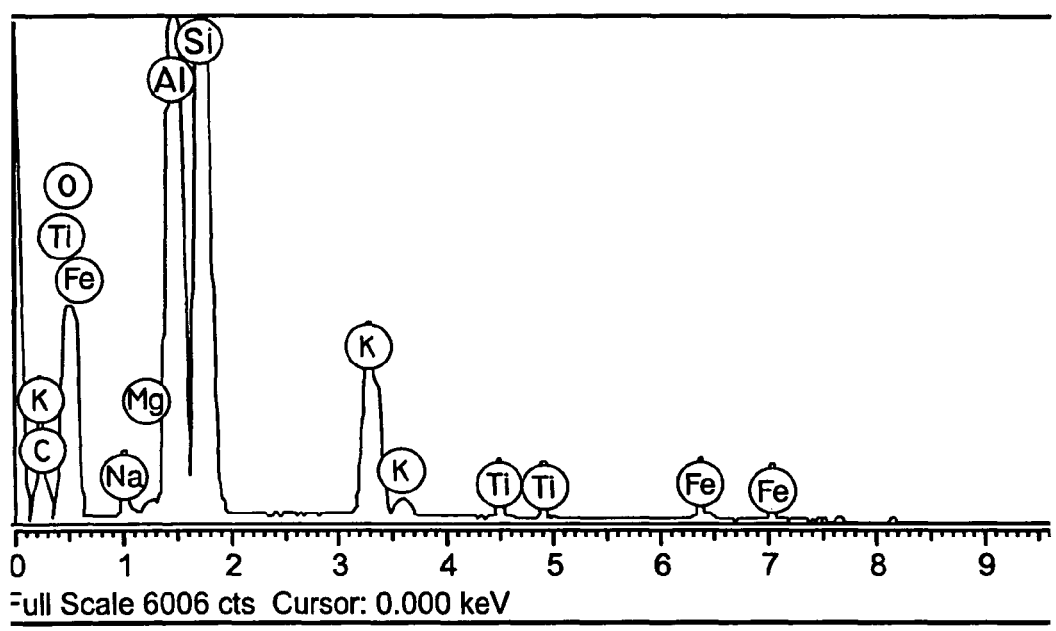
FIG. 11 depicts the chemical constituents of Muscovite single crystal after heat-treatment at 800° C., as determined using energy dispersive spectrometry.

Three micas were used in this study: Muscovite ($KAl_2(AlSi_3O_{10})(F,OH)_2$) paper, cleaved Muscovite single crystal sheet, and Phlogopite ($KMg_3(AlSi_3O_{10})(OH)_2$) paper. All three micas are about 0.1 mm thick. The Muscovite mica loses about 4% chemical water at about 600° C. Phlogopite mica is more stable in high temperatures, losing its chemical water at about 950° C. The paper-type micas are composed of discrete large mica flakes bonded with organic binders, and pressed into thin sheets. FIG. 7 shows the typical surface morphology of the Phlogopite mica paper. It is clear that there are large voids (un-overlapped regions) and the surface is relatively rough. The Muscovite mica paper also shows similar surface features. On the other hand, the cleaved Muscovite single crystal mica sheets are transparent as received and have much smoother surfaces, though there are some scratches present (FIG. 8). After treatment at 800° C., the single crystal lost chemical water, which resulted in more defects of the surface (FIG. 9). It also cleaved into many parallel sub-layers (FIG. 10). Energy dispersive spectrometry (EDS, FIG. 11) showed the Muscovite single crystal also contained small amounts of Na, Fe and Ti in addition to the major constituents (K, Al and Si).

Figure 12:
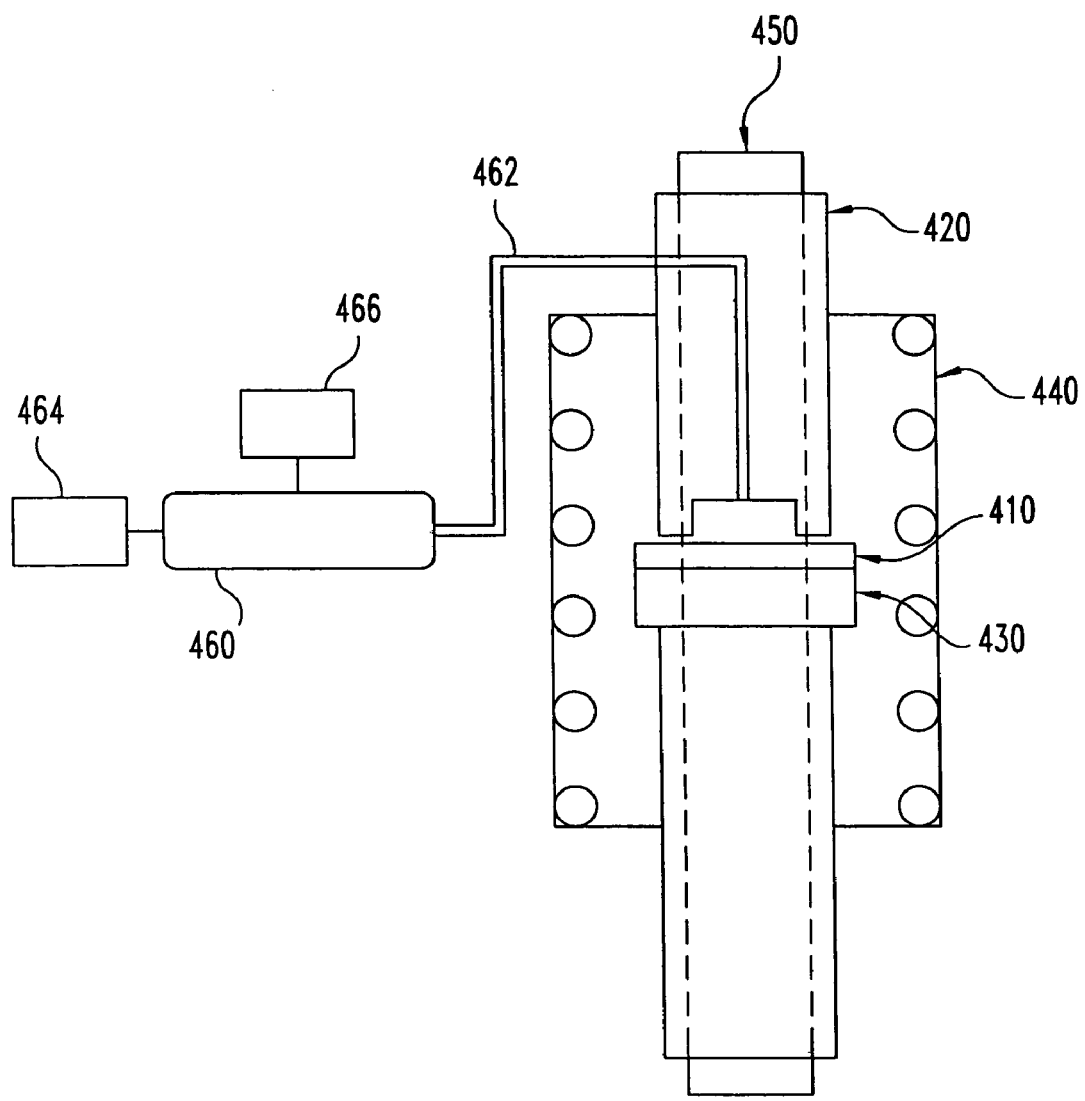
FIG. 12 is a schematic diagram showing the experimental setup for a leak test, as described in the Examples.

Mica samples 410 were cut into 1½ inch squares with a ½ inch diameter central hole. The mica squares 410 were then pressed between an Inconel tube 420 (outer diameter=1.3 inch and inner diameter=1.0 inch) and a dense alumina substrate 430. Samples were heated in a clamshell furnace 440 at a heating rate about 2° C./min to 800° C. The load was applied using a universal mechanical tester 450 with a constant load control (Model 5581, Instron, Canton, Mass.). The experimental setup is shown schematically as in FIG. 12. A large known-volume (370 cm$^3$) reservoir 460 was kept at ambient conditions and connected to the sample via a ⅛ inch Cu tube 462. By setting up a vacuum in the system via vacuum pump 464 (initially as low as about 100 mtorr), the leak rate was measured using pressure sensor 466 by monitoring the pressure change with time. The final pressure was about 2 torr. The pressure gradient across the mica seal therefore could be considered to be essentially constant at 14.7 psi. Assuming the ideal gas law, the leak rate (L) was calculated by the equation:

$$L=\Delta n/\Delta t=(n_f-n_i)/(t_f-t_i)=(p_f-p_i)V/RT(t_f-t_i)$$

where n is the moles of the gas, T is the temperature, V is the reservoir volume, R is the gas constant, t is the time, and p is the pressure. Subscripts f and i represent the final and the initial conditions. The calculated leak rate (L, in standard cubic centimeters per minute at STP, sccm) was further normalized with respect to the outer leak length (10.5 cm) of the Inconel tube and to a pressure gradient of 2 psi by the equation:

$$\overline{L} = L \times 2/(10.5 \times 14.7)$$

Thus, the unit for leak rate is standard cubic centimeters per minute per centimeter ("sccm/cm") and STP and with a pressure gradient of 2 psi.

Before each run, the leak rate of the background (or the system without test samples) was also measured and subtracted from the actual test runs. To ensure a constant temperature, all leak tests were conducted about ½ hour after reaching the desired temperatures (800° C.).

Data collected for the plain mica seal comparative test runs is set forth in Table I below.

TABLE I

Normalized leak rate (sccm/cm) for plain compressive mica seals at 800° C.

| Compressive stress (psi) | Muscovite single crystal | Muscovite paper | Phlogopite paper |
|---|---|---|---|
| 100 | 0.66 | 5.77 | 8.85 |
| 300 | 0.42 | 2.84 | 2.97 |
| 500 | 0.28 | 1.92 | 1.68 |

2. Rigid Glass Seal

For comparison, a test of a glass-only seal was also conducted using the same setup as described above and using a single layer of glass without the mica sheet. It is worthy of note that, irrespective of the form of the glass prior to the test, the glass softened at the temperatures used in the test, and then resolidified as the apparatus cooled after testing to form a rigid glass seal. For a rigid glass seal, it was found that the leak rate was about $5 \times 10^{-5}$ sccm/cm at 800° C. at a pressure gradient of 2 psi, using the current test setup. Ideally, the leak rate should be zero for a hermetic seal if the glass wets the surfaces in contact. In reality, the actual low leak rates were limited by the system's background since there were valves and tube connectors in the setup.

3. Discussion of Comparative Data

Figure 13A:
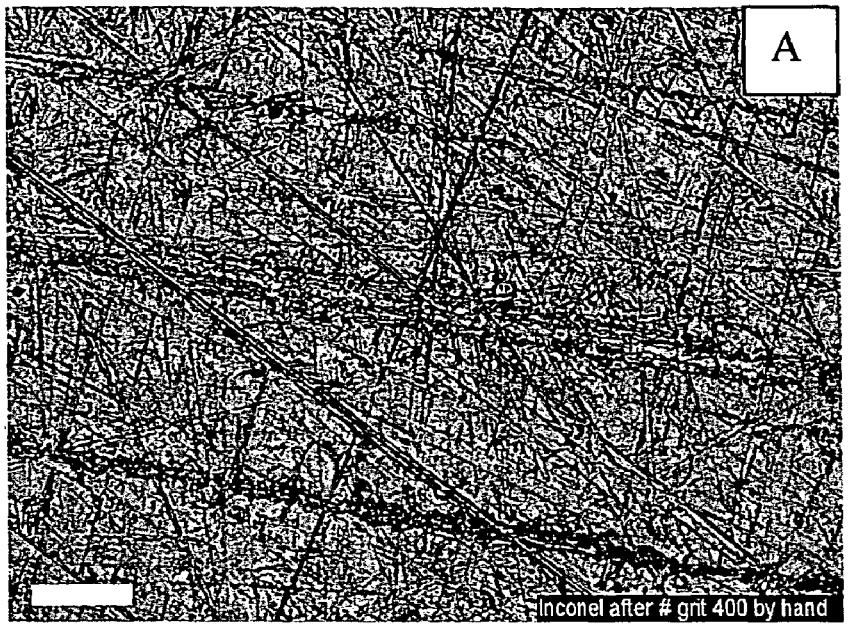
FIGS. 13A and 13B are micrographs showing the surface morphology of (A) Inconel tube which was ground with a #400 grit paper (bar=50 microns) and (B) alumina substrate (bar=20 microns), which reveal that surface defects include continuous straight grooves (A) and irregular sintering grooves (B).
Figure 13B:
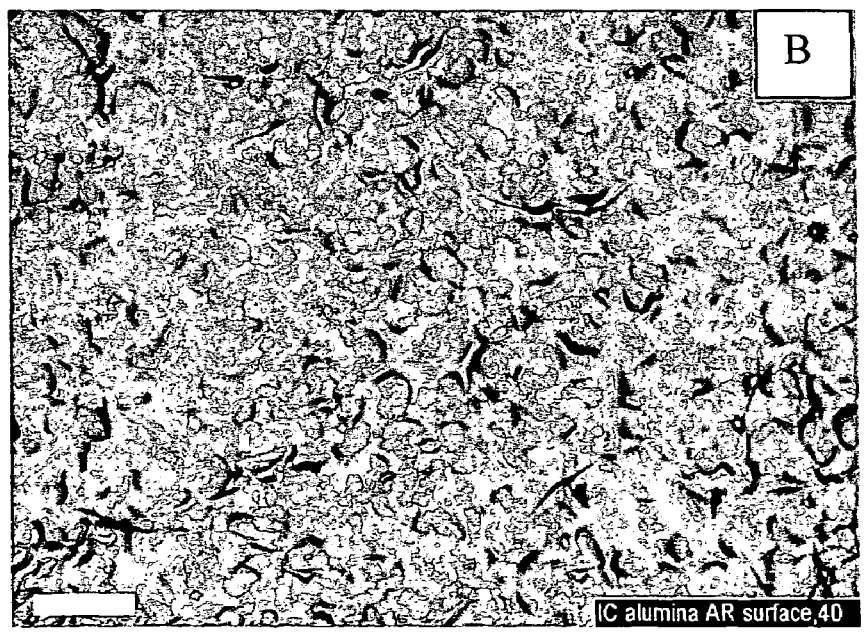

As for the compressive mica seals, Simner et al. reported a leak rate of 0.65 sccm/cm at the same conditions and a compressive stress of 100 psi using the Muscovite single crystal sheet (about 0.1 mm thick). (S. P. Simner and J. W. Stevenson, "Compressive mica seals for SOFC applications," *J. Power Sources*, 102 [1-2] 310-316 (2001)). It is appropriate to ask why the apparently flexible thin mica sheet allowed a leak rate about $10^4$ times higher than that of a glass seal (the as-received Muscovite single crystal sheet, though relatively stiff in its as-received form, becomes flexible (and fragile) when heated to 800° C.). Looking at a compressed mica between the Inconel tube and the alumina substrate, one can imagine there are two possible paths for leaks. One is from the interface between the metal tube (or the ceramic substrate) and the mica. The other one is through the mica itself, since it cleaves into many sub-layers after losing its chemically bonded water at elevated temperatures (Simner et al.). Looking at the surfaces of the contact materials (dense alumina as the support substrate and the Inconel tube as the top pressing ram, FIGS. 13A and 13B), it was evident that many defects were present, including long grooves on the metal and the irregular grooves (voids) on the ceramic substrate. Therefore, it seemed likely that the major leaks for the compressive mica seal occurred through these interfaces.

EXAMPLE TWO

Leak Test

Mica Gasket Body With Glass Interlayers

Figure 14:
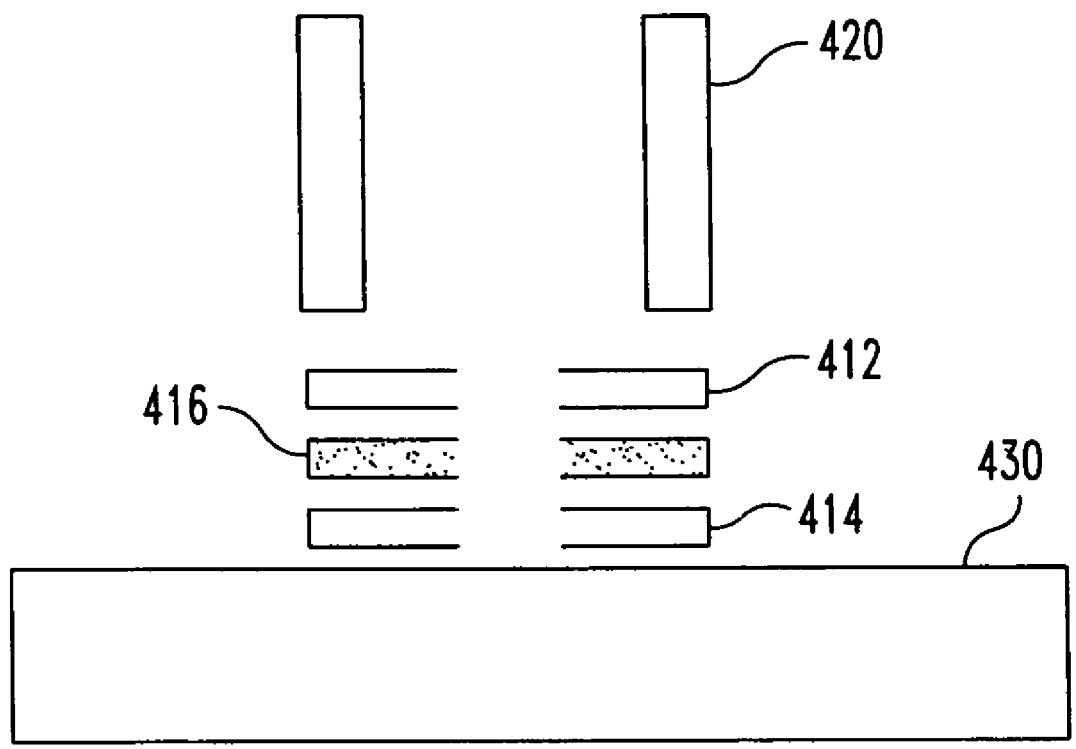
FIG. 14 is a schematic diagram showing one embodiment of a multi-layer compressive seal assembly for leak testing, as described in the Examples.

The same protocol was used as in Example 1, but the mica seals were replaced with multi-layer seals, in which glass interlayers 412, 414 were placed between the Inconel tube 420/mica 416 and mica 416/alumina 430 interfaces as shown in FIG. 14. For the glass interlayers, a borosilicate glass filter paper was used. The borosilicate glass contains about 58% $SiO_2$, about 9% $B_2O_3$, about 11% $Na_2O$, about 6% $Al_2O_3$, about 4% BaO, and ZnO, CaO and $K_2O$. The results of the multi-layer seal are set forth in Table II below.

TABLE II

Normalized leak rate (sccm/cm) for the multi-layer seals (glass interlayers) at 800° C.

| Compressive stress (psi) | Muscovite single crystal | Muscovite paper | Phlogopite paper |
|---|---|---|---|
| 25 | 0.000359 | — | — |
| 50 | 0.000243 | — | — |
| 100 | 0.000155 | 0.0126 | 0.0108 |
| 200 | — | 0.0122 | 0.0105 |
| 300 | — | 0.0115 | 0.0103 |
| 400 | — | 0.0107 | 0.0098 |
| 500 | — | — | — |

It is seen that the best results were obtained using Muscovite single crystal mica. The normalized leak rate for this seal at 800° C. was only $1.55 \times 10^{-4}$ sccm/cm at a stress of 100 psi and a pressure gradient of 2 psi, which is a leak rate about 4300 times lower than the leak rate of a simple mica seal at this temperature. Seals based on the other commercial micas (Muscovite and Phlogopite mica papers), also exhibited superior leak rates (about 0.011 sccm) compared to simple mica seals without the compliant glass interlayer (about 6 to about 9 sccm/cm).

The multi-layer seals with glass interlayers are shown to exhibit excellent sealing function for electrochemical devices, considering the low leak rates reported above. For a 60-cell (14 cm×14 cm active area per cell) stack, producing 0.5 W/cm² or 5.9 kW total gross power on steam reformed methane (steam to carbon mole ratio of 3.0), at 65% fuel utilization, 20% oxygen utilization, the total reformate gas flow rate entering the anode is estimated to be $1.36 \times 10^5$ sccm (STP). Assuming that the leak rate (per cm of seal length) measured in this study applied to full size stacks, the total leak rate for a 60-cell stack at 800° C. would be only 0.0019% of the total fuel rate for the multi-layer seal including a Muscovite single crystal mica gasket body and glass interlayers under a stress of 25 psi and a 2 psi pressure gradient (a leak length of 124 cm was assumed for each layer).

EXAMPLE THREE

Materials Damage Analysis

Mica Gasket body With Glass Interlayers

The microstructure of the mica was examined before and after the 800° C. leak tests using scanning electron microscopy to assess whether the use of a low melting glass as the seal interlayer could damage the materials with which it is in contact (e.g., metal, ceramic, and the mica itself), especially under the compressive stresses. Though long-term stability tests are underway, preliminary results showed no substantial corrosion or melting of the materials in contact. The corrosion at the glass metal/interface was limited to a depth of a few microns. This may result from the fact that the majority of the glass was squeezed out from between the components at elevated temperatures under the compressive stresses. If only a thin glass interlayer is left behind, only limited corrosion or melting would be likely to occur. As for the mica itself, degradation might be expected due to interaction between the mica (an aluminosilicate) and the borosilicate glass, but no significant degradation was observed. The mica remained intact except for a few surface sub-layers which bonded to the metal tube and the ceramic substrate when the test specimens were disassembled after testing.

EXAMPLE FOUR

Effects of Compressive Stress on Leak Rate

Mica Gasket body With Glass Interlayers and Comparitive Data

The 800° C. leak rates for the three micas, with and without glass interlayers and at various compressive stesses are summarized in Table III below.

It is also interesting to note that the effect of increasing the applied compressive stress was much weaker for the multi-layer seals than for the plain mica seals. This is especially clear for the paper-type micas. For example, the leak rate reduced about 81% (from 8.85 sccm/cm to 1.68 sccm/cm) for Phlogopite mica paper when the compressive stress increased 400% from 100 psi to 500 psi. For the multi-layer form, the leak rate only reduced about 10% (from 0.0108 sccm/cm to 0.0098 sccm/cm) for a 300% increase in the stress from 100 psi to 400 psi. Similar results were also evident for the Muscovite mica paper. No substantial difference was observed between the Phlogopite mica paper and the Muscovite mica paper, though the former is more stable at higher temperatures than the latter. These results are consistent with previously reported data. Simner et al. reported a similar reduction for a thicker Phlogopite paper (0.5 mm) while using high purity helium at a 2 psi positive pressure gradient; in that study the leak rate dropped about 85% from 6.26 sccrncm to 0.97 sccm/cm when the applied stress increased from 100 psi to 500 psi. (Simner et al.).

In the case of the Muscovite single crystal mica, there was a strong dependence on the applied compressive stress for both the multi-layer seals and the plain mica seals. However, the stress range for the multi-layer seal with single crystal mica was only from 25 psi to 100 psi (at higher stresses the

TABLE III

Normalized leak rate (sccm/cm) for the multi-layer seals and plain compressive mica seals at 800° C.

| Compressive stress (psi) | Muscovite single crystal | | Muscovite paper | | Phlogopite paper | |
|---|---|---|---|---|---|---|
| | plain | multi-layer | plain | multi-layer | plain | multi-layer |
| 25 | — | 0.000359 | — | — | — | — |
| 50 | — | 0.000243 | — | — | — | — |
| 100 | 0.66 | 0.000155 | 5.77 | 0.0126 | 8.85 | 0.0108 |
| 200 | — | — | — | 0.0122 | — | 0.0105 |
| 300 | 0.42 | — | 2.84 | 0.0115 | 2.97 | 0.0103 |
| 400 | — | — | — | 0.0107 | — | 0.0098 |
| 500 | 0.28 | — | 1.92 | — | 1.68 | — |

Figure 15:
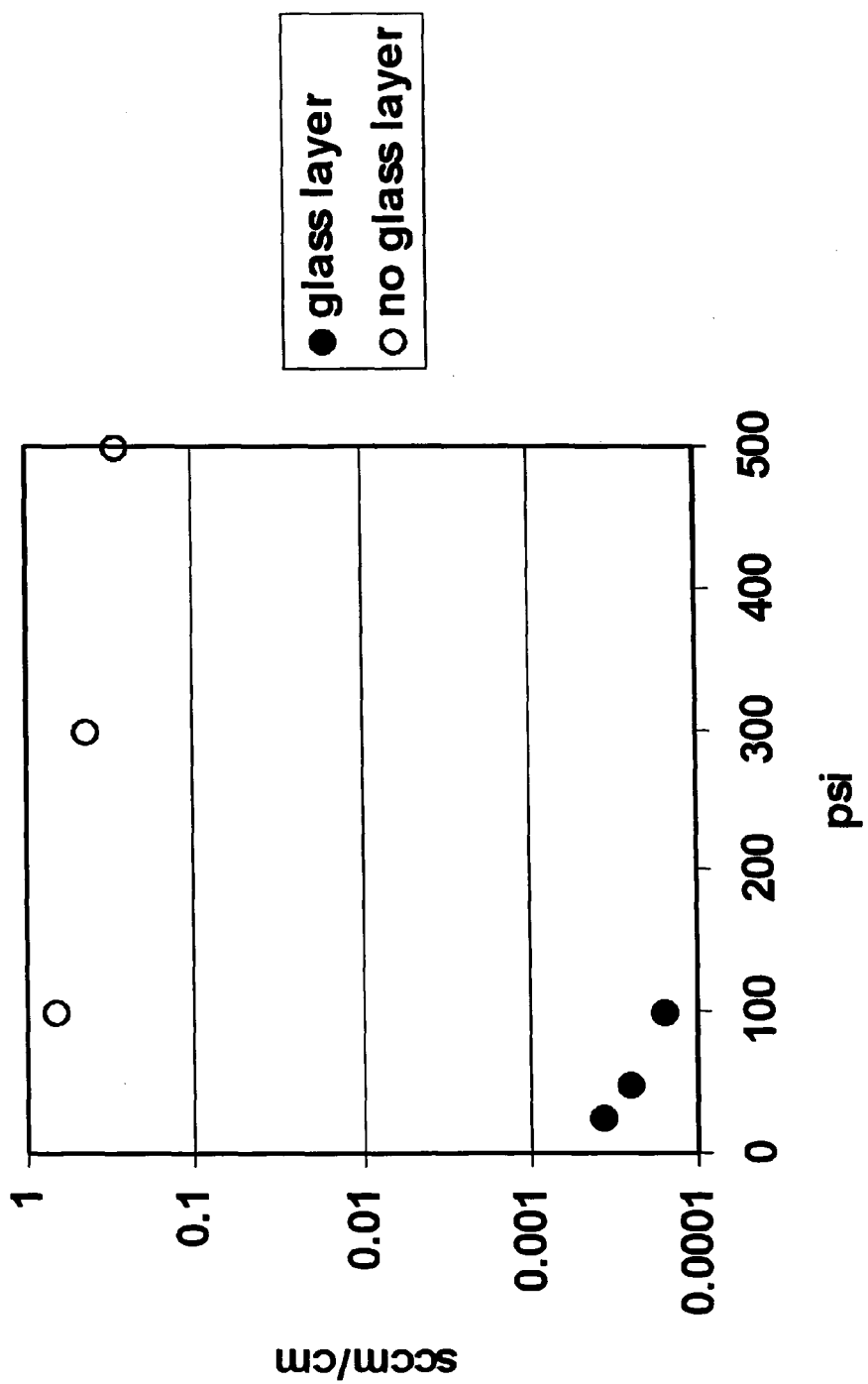
FIG. 15 is a plot showing the effect of the compressive stress on the normalized leak rate of seals having a gasket body composed of Muscovite mica in the single crystal form, with and without glass interlayers, at 800° C., as described in the Examples.
Figure 16:
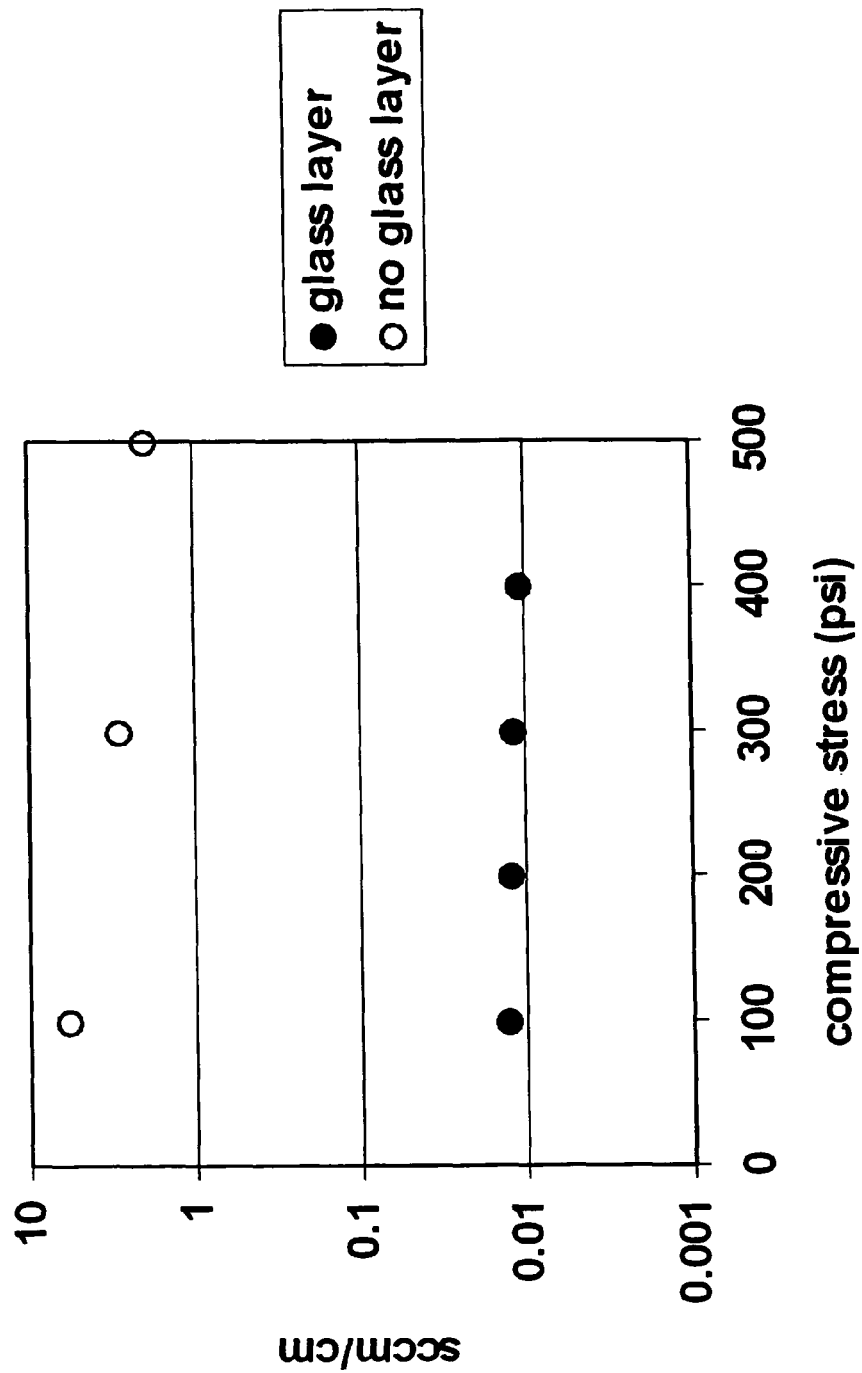
FIG. 16 is a plot showing the effect of the compressive stress on the normalized leak rate of seals having a gasket body composed of Muscovite mica paper, with and without glass interlayers, at 800° C., as described in the Examples.
Figure 17:
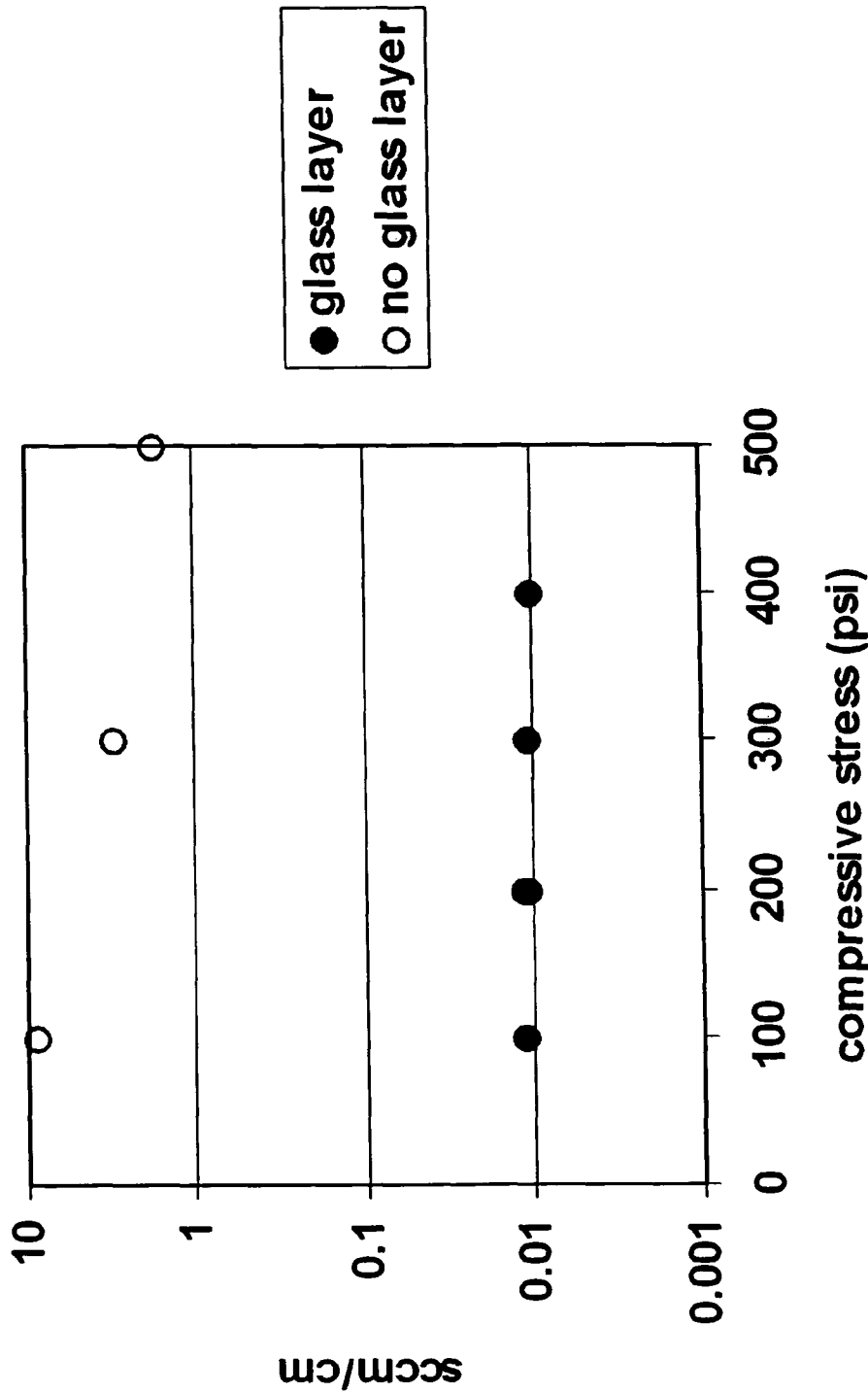
FIG. 17 is a plot showing the effect of the compressive stress on the normalized leak rate of seals having a gasket body composed of Phlogopite mica paper, with and without glass interlayers, at 800° C., as described in the Examples.

The results are also plotted as a function of the compressive stresses for Muscovite single crystal mica sheet (FIG. 15), Muscovite mica paper (FIG. 16), and Phlogopite mica paper (FIG. 17). It is evident that the leak rates were greatly reduced for multi-layer seals as compared to the plain compressive mica seals. For example, the Muscovite single crystal mica showed an extremely low leak rate of $1.55 \times 10^{-4}$ sccm/cm 800° C. and a compressive stress of 100 psi. As for the plain Muscovite single crystal mica, i.e. without the glass interlayers, the leak rates at the same test conditions were 0.66 sccm/cm, approximately 4300 times higher. Similar behaviors were observed for the paper type (discrete mica flakes bonded with organic binders) Muscovite and Phlogopite micas. For example, the leak rates for the multi-layer seal including a Muscovite paper gasket body and glass interlayers were 0.0126 sccm/cm, about 460 times lower than the plain Muscovite mica paper (5.77 sccm/cm) at 800° C. and a stress of 100 psi. The leak rates for the multi-layer seal including a Phlogopite mica paper gasket body and glass interlayers were 0.0108 sccm/cm, about 820 times lower than that of the plain Phlogopite mica paper (8.85 sccm/cm). The results clearly indicate that the major leaks occurred at the Inconel tube/mica and mica/ceramic substrate interfaces.

leak rates were close to the system's background, so tests were not conducted). It is expected that the multi-layer seal with single crystal mica would also show less dependence on stress at higher compressive loads since the sub-layers (after the loss of chemical water at elevated temperatures FIG. 10) are more closely overlapped with each other. The fact that the multi-layer seals were less dependent on the compressive stress is consistent with the fact that the major leaks occur at the interfaces between the mica and the metal tube or the interface between the mica and the ceramic substrate. The glass used as the interlayer is a borosilicate glass which melts at around 600° C. and therefore can fill and seal surface defects such as long grooves or voids.

Overall, it is clear that the Muscovite single crystal micas offer superior performance to the mica papers in multi-layer seals; for example, the leak rate for a Muscovite multi-layer seal was only $3.59 \times 10^{-4}$ sccm/cm at a low compressive stress of 25 psi. Based upon microstructural examination of these materials, this is likely due to the fact that the paper type micas are composed of discrete mica flakes/platelets, so that the leak paths are 3-dimensional, whereas the single crystal micas tend to have only 2-dimensional leak paths (through the cleavage planes). Though the single crystal mica sheets did form some defects after the loss of chemical water at elevated temperatures, these defects (micro-cracks) were minute in size compared to the connected voids which were prevalent in the mica papers.

EXAMPLE FIVE

Leak Test

Mica Gakset Body With Metallic Interlayers

The protocol set forth in Example Two was repeated using a multi-layer seal composed of a mica gasket body and two compliant metallic interlayers. The metallic material used as the compliant layers in these tests was silver in the form of a thin foil.

The results of testing of multi-layer seals having metallic interlayers are set forth in Table IV below, which also includes data for the plain compressive mica seals and multi-layer seals with glass interlayers, as set forth in Table III.

EXAMPLE SIX

Effects of Compressive Stress on Leak Rate

Mica Gasket Body With Metallic Interlayers and Comparitive Data

Figure 18:
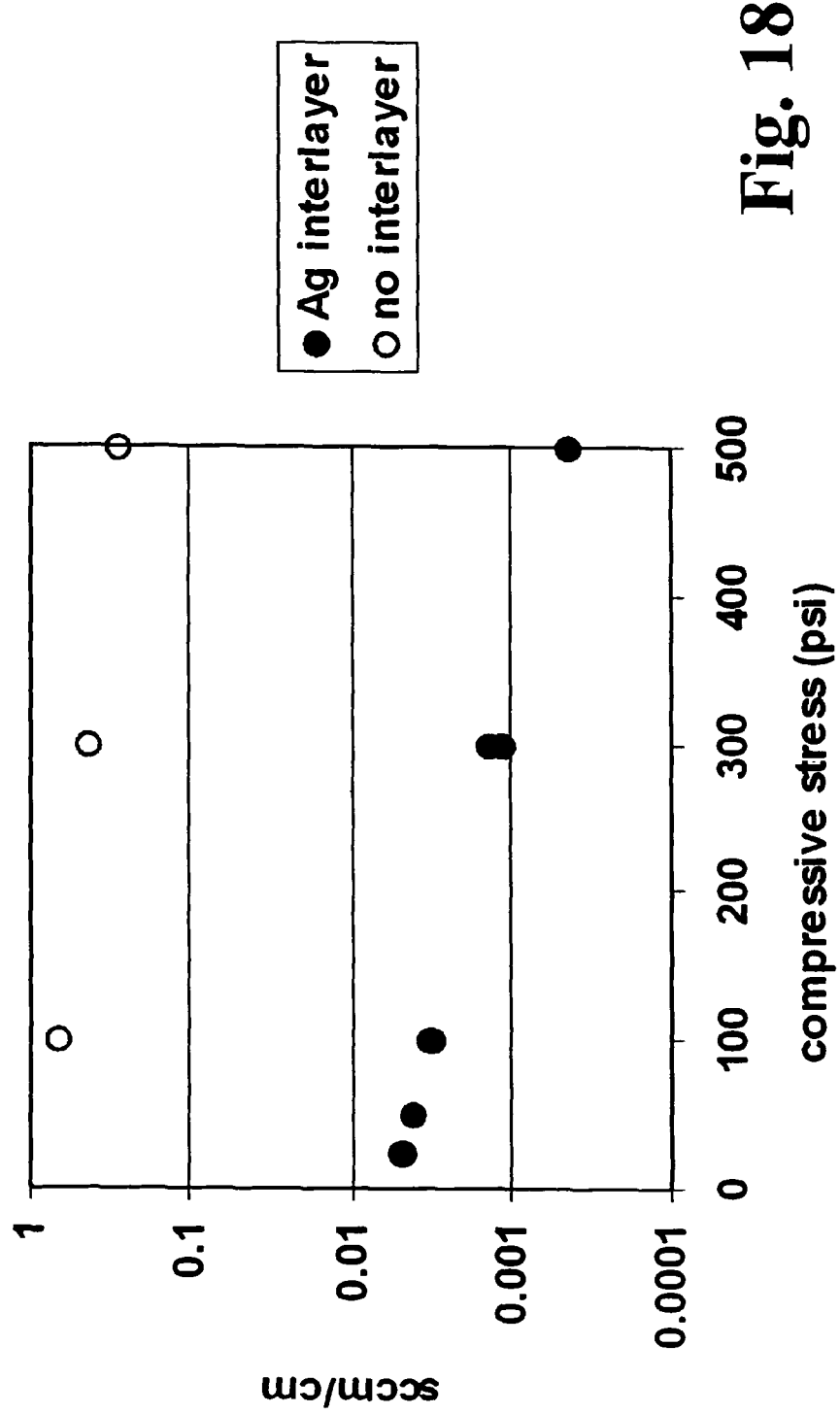
FIG. 18 is a plot showing the effect of the compressive stress on the normalized leak rate of seals having a gasket body composed of Muscovite mica in the single crystal form, with and without metallic interlayers, at 800° C. and a pressure gradient of 2 psi across the seal, as described in the Examples.
Figure 19:
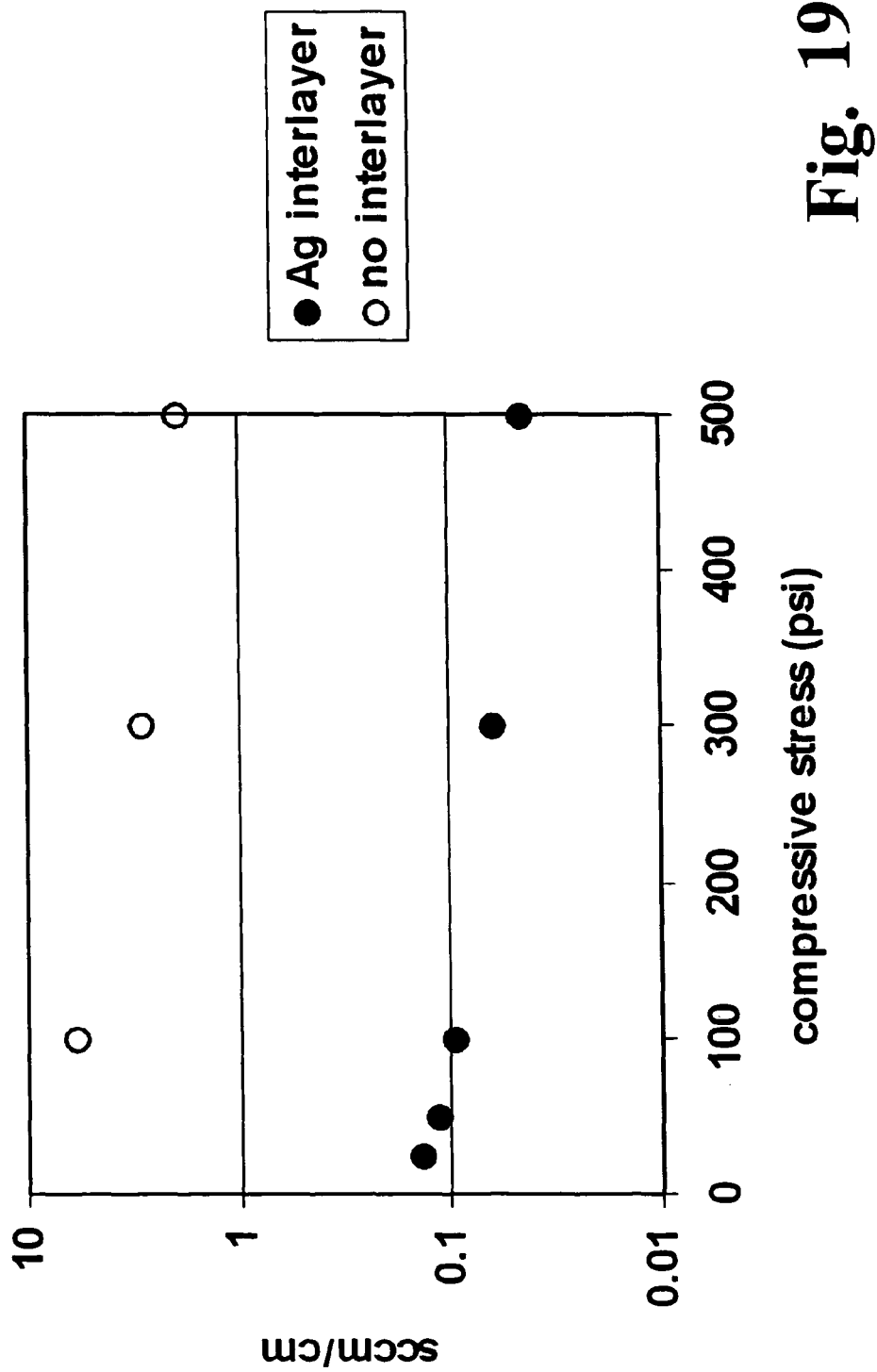
FIG. 19 is a plot showing the effect of the compressive stress on the normalized leak rate of seals having a gasket body composed of Muscovite mica paper, with and without metallic interlayers, at 800° C. and a pressure gradient of 2 psi across the seal, as described in the Examples.
Figure 20:
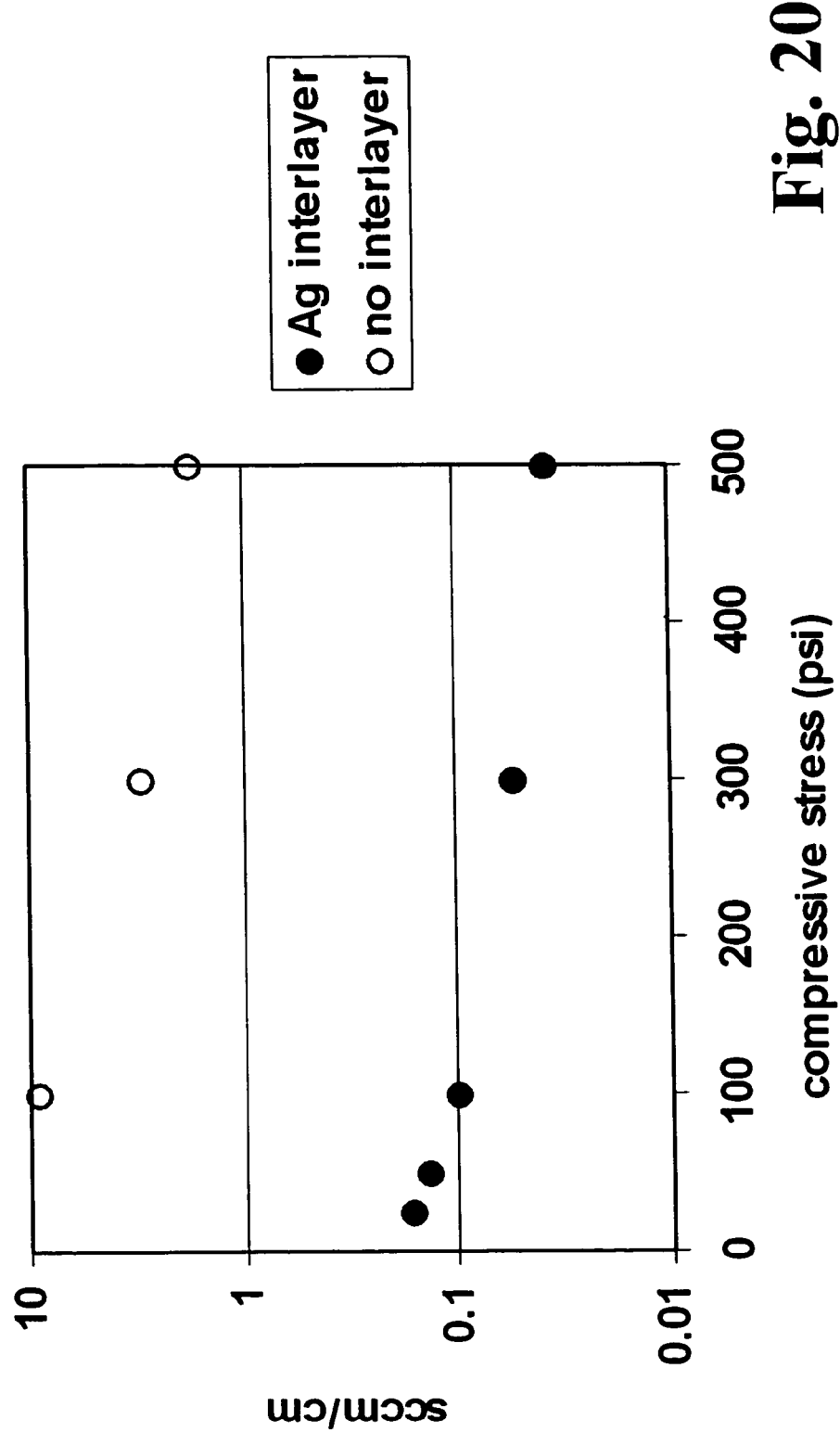
FIG. 20 is a plot showing the effect of the compressive stress on the normalized leak rate of seals having a gasket body composed of Phlogopite mica paper, with and without metallic interlayers, at 800° C. and a pressure gradient of 2 psi across the seal, as described in the Examples.

Leak rates were also determined for the three micas at various compressive pressures, and the results are summarized in Table IV above. Table IV includes data of the multi-layer seals (with glass interlayers and metallic interlayers) and the plain compressive mica seals. The results are also plotted as a function of the compressive stresses for Muscovite single crystal mica sheet (FIG. 18), Muscovite mica paper (FIG. 19), and Phlogopite mica paper (FIG. 20). It is evident that the leak rates were greatly reduced for the multi-layer seals with metallic interlayers as compared to the plain compressive mica seals.

TABLE IV

Normalized leak rates (sccm/cm) for the plain mica seals and the multi-layer seals at 800° C.

| Compressive stress (psi) | Muscovite single crystal | | | | Muscovite paper | | Phlogopite paper | |
|---|---|---|---|---|---|---|---|---|
| | plain | multi-layer (glass) | multi-layer (1 mil Ag) | multi-layer (5 mil Ag) | plain | multi-layer (1 mil Ag) | plain | multi-layer (1 mil Ag) |
| 25 | — | 0.000359 | 0.0047 | 0.0019 | — | 0.134 | — | 0.164 |
| 50 | — | 0.000243 | 0.0040 | 0.0014 | — | 0.114 | — | 0.134 |
| 100 | 0.66 | 0.000155 | 0.0030 | 0.00089 | 5.77 | 0.094 | 8.85 | 0.098 |
| 200 | — | — | — | 0.00036 | — | — | — | — |
| 300 | 0.42 | — | 0.0012 | 0.00022 | 2.84 | 0.060 | 2.97 | 0.053 |
| 400 | — | — | — | — | — | — | — | — |
| 500 | 0.28 | — | 0.00043 | — | 1.92 | 0.044 | 1.68 | 0.037 |

It is seen that the leak rates are also greatly reduced for the multi-layer seals with metallic interlayers as compared to plain compressive mica seals. It is also seen that the best results were again obtained using Muscovite single crystal mica. The normalized leak rate for the multi-layer seal with 5 mil silver interlayers at 800° C. was only $8.9 \times 10^{-4}$ sccm/cm at a stress of 100 psi and a pressure gradient of 2 psi, which is a leak rate about 740 times lower than the leak rate of a simple mica seal at this temperature. Seals based on the other commercial micas (Muscovite and Phlogopite mica papers), also exhibited superior leak rates (about $9.5 \times 10^{-2}$ sccm/cm) compared to simple mica seals without the compliant metallic interlayer (about 6 to about 9 sccm/cm).

The multi-layer seals with metallic interlayers are also shown to exhibit excellent sealing function for electrochemical devices, considering the low leak rates reported above. For a 60-cell (14 cm×14 cm active area per cell) stack, producing 0.5 W/cm² or 5.9 kW total gross power on steam reformed methane (steam to carbon mole ratio of 3.0), at 65% fuel utilization, 20% oxygen utilization, the total reformate gas flow rate entering the anode is estimated to be $1.36 \times 10^5$ sccm (STP). Assuming that the leak rate (per cm of seal length) measured in this study applied to full size stacks, the total leak rate for a 60-cell stack at 800° C. would be only 0.026% of the total fuel rate for the multi-layer seal including a Muscovite single crystal mica gasket body and metallic interlayers under a stress of 25 psi and a 2 psi pressure gradient (a leak length of 124 cm was assumed for each layer).

The effect of increasing the applied compressive stress was also much weaker for the multi-layer seals with metallic interlayers than for the plain mica seals. This is especially clear for the paper-type micas. For example, the leak rate reduced about 81% (from 8.85 sccm/cm to 1.68 sccm/cm) for Phlogopite mica paper when the compressive stress increased 400% from 100 psi to 500 psi (Table 1). For the multi-layer form, the leak rate only reduced about 62% (from $9.8 \times 10^{-2}$ sccm/cm to $3.7 \times 10^{-2}$ sccm/cm) for the same increase in the stress. Similar results were also evident for the Muscovite mica paper. No substantial difference was observed between the Phlogopite mica paper and the Muscovite mica paper, though the former is more stable at higher temperatures than the latter. These results are also consistent with previously reported data.

EXAMPLE SEVEN

Effect of Metallic Interlayer Thickness on Leak Rate

Figure 21:
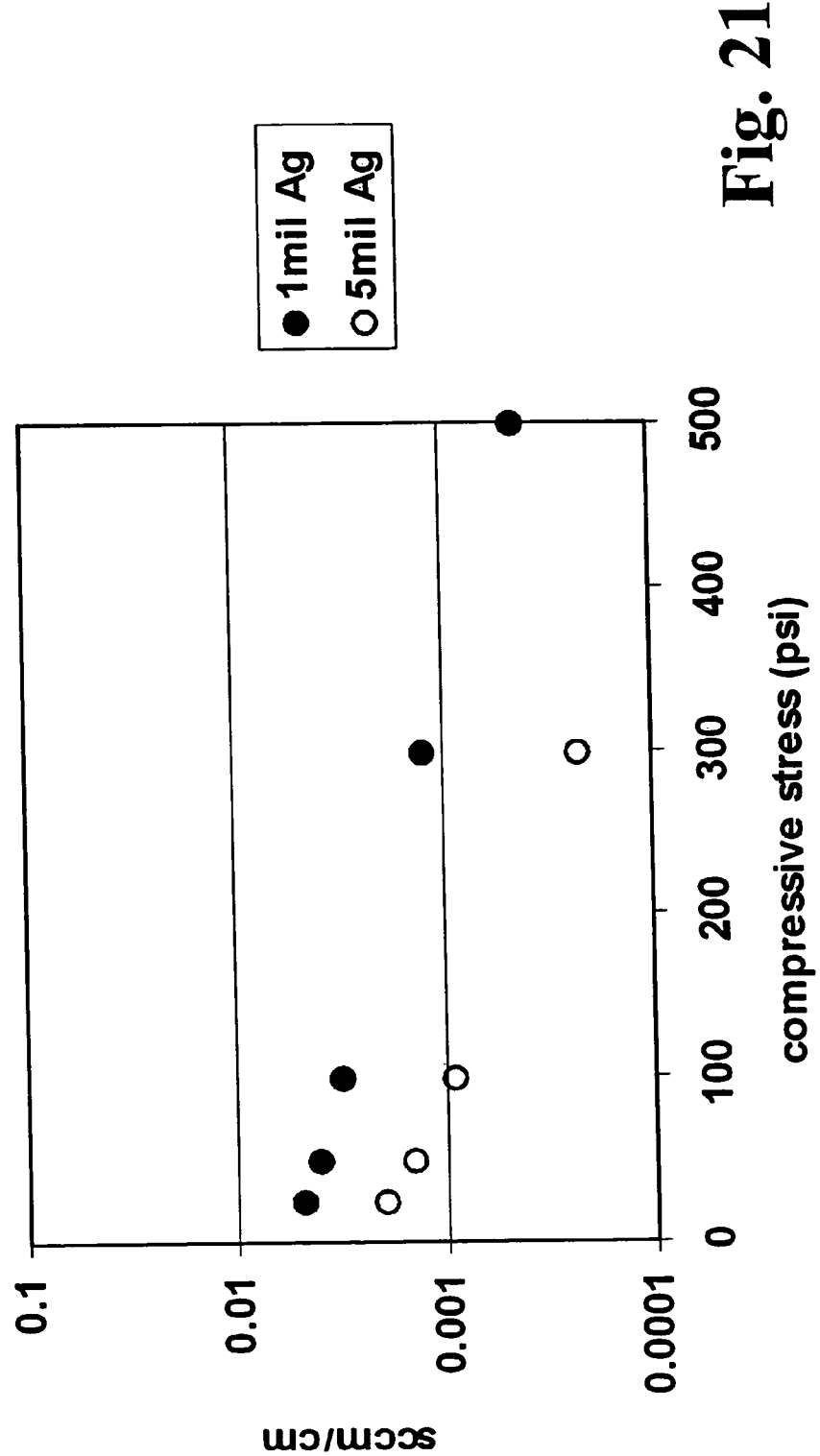
FIG. 21 is a plot showing the effect of the compressive stress on the normalized leak rate for multi-layer seals having a gasket body layer of Muscovite mica in the single crystal form, and having silver interlayers of different thicknesses, at 800° C. and a pressure gradient of 2 psi across the seal.

FIG. 21 shows the 800° C. leak rates of the multi-layer seal using Muscovite single crystal mica and silver interlayers of two thicknesses: 1 mil (25 microns) and 5 mil (125 microns). It is evident that the thicker silver interlayers have lower leak rates. For example, the leak rates at a compressive stress of 100 psi were $8.9 \times 10^{-4}$ sccm/cm using the 5 mil Ag layers, and were $3.0 \times 10^{-3}$ sccm/cm using the 1 mil Ag.

The thickness variation along the pressed ring (1.3 inch outside diameter, and 1.0 inch inner diameter) sections was measured with a digital micrometer along the 12 hour positions. Alumina substrate was found to be more uniform in the thickness (with a maximum thickness of 514 microns and a minimum thickness of 507 microns), whereas the as-received Muscovite single crystal mica varies more in the thickness (with a maximum thickness of 122 microns and a minimum thickness of 107 microns). In view of the 7 micron fluctuation on the Alumina substrate surface and the 15 micron fluctuation in the mica surface, the worst-case gap between the surfaces would be 7+15=22 microns. A determination of surface variation was not made for the Inconel tube surface.

The difference in FIG. 21 is likely due to the thickness variation of samples used that are not perfectly flat (i.e., not the same thickness throughout the pressed ring section). Using a thicker silver foil appears to be more effective in space/defect filling for the components used in this test. It is also worthy of note, however, that thinner (1 mil) silver interlayers provide adequate seals for most applications, and are less expensive.

EXAMPLE EIGHT

Figure 22:
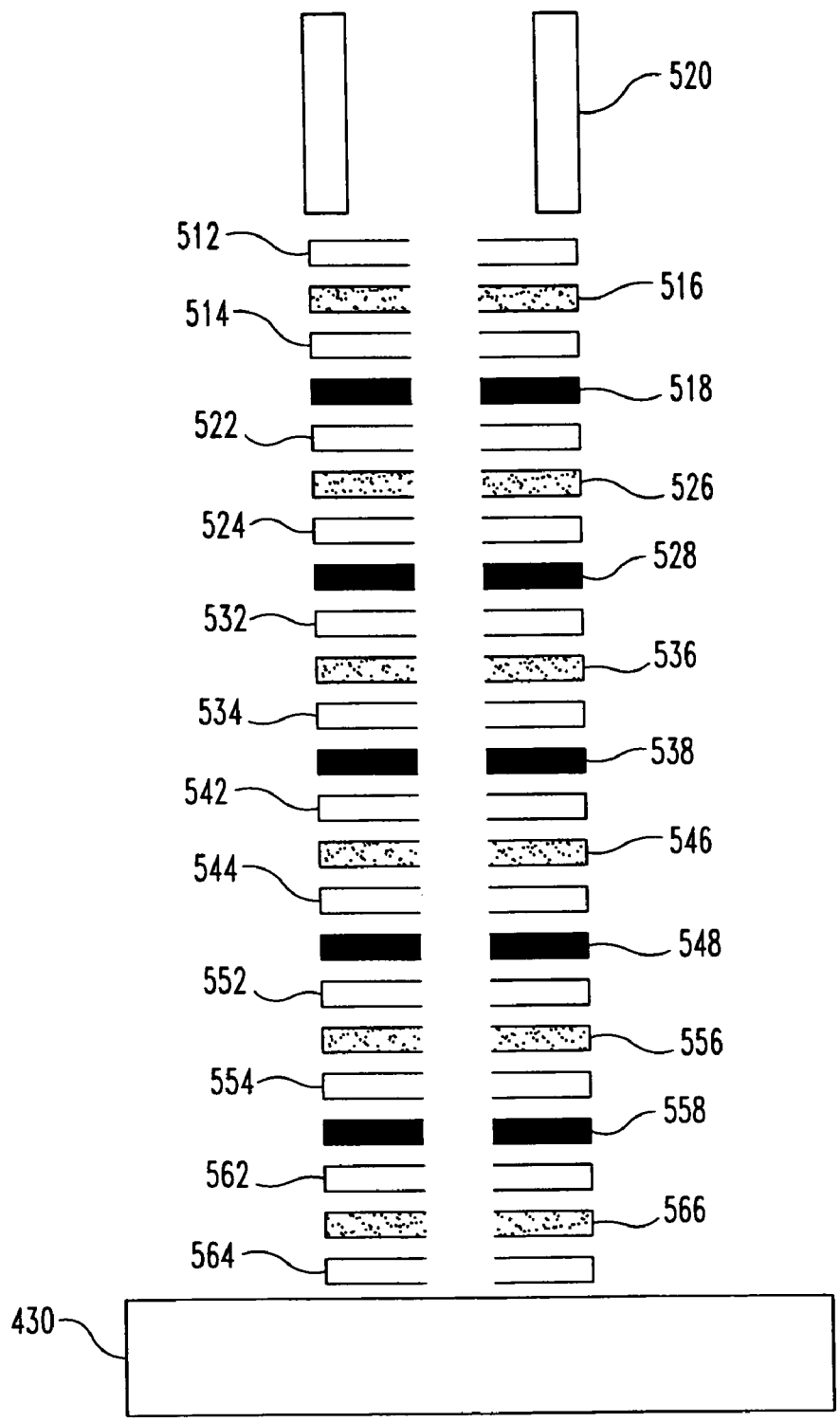
FIG. 22 is a schematic diagram showing the experimental setup for a leak test of multiple seals, as described in the Examples

Glass Interlayer Test With Multiple Stacked Components Having Multi-Layer Seals Therebetween A simulated multiple component assembly was also tested. In this test, six multi-layer seals having gasket bodies of Muscovite single crystal mica and borosilicate glass interlayers were used. Five layers of metal sheet (SS 430 with a nominal sheet thickness of 0.010 inches) were placed between the multi-layer seals, as depicted in FIG. 22. An 8-cycle run was performed in which the temperature of the device was cycled between 100° C. and 800° C. under a compressive stress of 100 psi. The results of this leak test are set forth below in Table V. For each cycle multiple measurements were conducted as shown in Table V.

TABLE V

Total and normalized leak rates of an assembly having six multi-layer seals after cycling from 100° C. to 800° C. in air at a constant stress of 100 psi.

| Cycle | sscm (total) | sscm/cm |
|---|---|---|
| 1 | 0.541 | 0.0086 |
| 1 | 0.545 | 0.0087 |
| 1 | 0.558 | 0.0089 |
| 2 | 0.681 | 0.0108 |
| 2 | 0.737 | 0.0117 |
| 2 | 0.733 | 0.0116 |
| 3 | 0.849 | 0.0135 |
| 3 | 0.853 | 0.0135 |
| 3 | 0.857 | 0.0136 |
| 3 | 0.827 | 0.0131 |
| 4 | 0.814 | 0.0129 |
| 4 | 0.813 | 0.0129 |
| 4 | 0.816 | 0.0130 |
| 8 | 1.14 | 0.0181 |
| 8 | 1.14 | 0.0181 |
| 8 | 1.14 | 0.0181 |

It is evident that the multi-layer seal showed very good stability under thermal cycling. Optical microscopy also confirmed that no melting of mica was observed and the individual layers (SS430 and mica layers) were easily separated after the test.

While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected. Any experiments, experimental examples, or experimental results provided herein are intended to be illustrative of the present invention and should not be considered limiting or restrictive with regard to the invention scope. Further, any theory, mechanism of operation, or finding stated herein is meant to further enhance understanding of the present invention and is not intended to limit the present invention in any way to such theory, mechanism or finding. All publications, patents, and patent applications cited in this specification are herein incorporated by reference as if each individual publication, patent, or patent application were specifically and individually indicated to be incorporated by reference and set forth in its entirety herein.

What is claimed is:

1. A multi-layer seal for sealing a junction between adjacent components of an electrochemical device, said seal comprising:
   a gasket body defining first and second opposing surfaces;
   a first compliant interlayer positioned adjacent the first surface; and
   a second compliant interlayer positioned adjacent the second surface, wherein the gasket body comprises a member selected from the group consisting of a single crystal mica and a mica paper, each of said first and second compliant interlayers individually comprises a member selected from the group consisting of a glass, a glass-ceramic, a mica glass-ceramic, a phase-separated glass, a glass composite, a cermet, a metal, a metal alloy and a metal composite, at least one of the first and second compliant interlayers is unbonded to the gasket body at least until the multi-layer seal is incorporated into the electrochemical device, the multi-layer seal is configured to prevent flow between the adjacent components in a direction substantially from the first surface to the second surface and is configured to withstand temperatures greater than about 600° C.

2. The seal in accordance with claim 1 wherein the opposing surfaces of said gasket body are configured to correspond to junction surfaces of the adjacent components.

3. The seal in accordance with claim 1 wherein each of said first and second compliant interlayers is positioned to be disposed between said gasket body and the junction surface of one of the adjacent components.

4. The seal in accordance with claim 1 wherein said gasket body comprises a mica selected from the group consisting of Muscovite, Phlogopite, Biotite, Fuchsite, Lepidolite and Zinnwaldite.

5. The seal in accordance with claim 1 wherein at least one of said first and second compliant interlayers comprises glass.

6. The seal in accordance with claim 5 wherein the glass has a softening point lower than or equal to the operating temperature of the electrochemical device.

7. The seal in accordance with claim 5 wherein the glass includes an alkaline earth element selected from the group consisting of strontium, magnesium and calcium or an alkali additive selected from the group consisting of sodium, potassium and lithium.

8. The seal in accordance with claim 5 wherein the glass comprises a borosilicate glass.

9. The seal in accordance with claim 1 wherein at least one of said first and second compliant interlayers comprises a metal.

10. The seal in accordance with claim 9 wherein the metal is resistant to oxidation under operating conditions of the electrochemical device.

11. The seal in accordance with claim 9 wherein the metal is selected from the group consisting of gold, silver, palladium and platinum.

12. The seal in accordance with claim 9 wherein at least one of said first and second compliant interlayers is a metallic foil having a thickness of from about 0.005 millimeters to about 1 millimeter.

13. The seal in accordance with claim 1 wherein said gasket body has a thickness of from about 25 microns to about 1 millimeter.

14. The seal in accordance with claim 1 wherein each of said compliant layers has a thickness of from about 0.005 millimeters to about 1 millimeter.

15. The seal in accordance with claim 1 where the gasket body comprises a single sheet of mica.

16. The seal in accordance with claim 1 wherein the gasket body consists essentially of a single sheet of mica.

17. The seal in accordance with claim 16, wherein the gasket consists essentially of a single sheet of single crystal mica or mica paper.

18. The seal in accordance with claim 1 wherein a compressive force is applied to the first compliant interlayer and the second compliant interlayer to achieve sealing.

19. A multi-layer seal, comprising:
a gasket body consisting essentially of a single sheet comprising mica, the gasket body defining first and second generally flat opposing surfaces;
a first compliant interlayer positioned adjacent the first surface; and
a second compliant interlayer positioned adjacent the second surface, wherein at least one of the first and second compliant interlayers comprises a composition different from the composition of the gasket body, each of said first and second compliant interlayers individually comprises a member selected from the group consisting of a glass, a glass-ceramic, a mica glass-ceramic, a phase-separated glass, a glass composite, a cermet, a metal, a metal alloy and a metal composite, the multi-layer seal is configured to withstand temperatures greater than about 600° C., and at least one of the first and second compliant interlayers is unbonded to the gasket body at least until the multi-layer seal is incorporated into an electrochemical device.

20. The multi-layer seal in accordance with claim 19 configured to withstand temperatures greater than about 650° C.

21. The multi-layer seal in accordance with claim 19 configured to withstand temperatures greater than about 800° C.

22. The multi-layer seal in accordance with claim 19 wherein at least one of the first and second compliant interlayers comprises a metallic foil.

23. A multi-layer seal, comprising:
a gasket body consisting essentially of a single sheet comprising mica, the gasket body defining first and second generally flat opposing surfaces;
a first compliant interlayer positioned adjacent the first surface; and
a second compliant interlayer positioned adjacent the second surface, wherein at least one of the first and second compliant interlayers comprises a composition different from the composition of the gasket body, each of said first and second compliant interlayers individually comprises a member selected from the group consisting of a glass, a glass-ceramic, a mica glass-ceramic, a phase-separated glass, a glass composite, a cermet, a metal, a metal alloy and a metal composite, the multi-layer seal is configured to prevent flow in a direction substantially perpendicular to a major planar surface of the multi-layer seal, and is configured to withstand temperatures greater than about 600° C., and at least one of the first and second compliant interlayers is unbonded to the gasket body at least until the multi-layer seal is incorporated into an electrochemical device.

24. The multi-layer seal in accordance with claim 23 wherein the gasket body comprises mica paper.

25. The multi-layer seal in accordance with claim 23 wherein the first compliant material, the second compliant material or both comprises a metallic foil.

26. A multi-layer seal, comprising:
a gasket body consisting essentially of a single sheet comprising mica, the gasket body defining first and second generally flat opposing surfaces;
a first compliant interlayer positioned adjacent the first surface; and
a second compliant interlayer positioned adjacent the second surface, wherein at least one of the first and second compliant interlayers comprises a composition different from the composition of the gasket body, the multi-layer seal is configured to withstand temperatures greater than about 600° C., and the first compliant interlayer, the second compliant interlayer or both comprise a metallic foil selected from the group consisting of gold, silver, palladium and platinum.

* * * * *